(12) United States Patent
McCormak et al.

(10) Patent No.: US 10,602,363 B2
(45) Date of Patent: *Mar. 24, 2020

(54) EHF SECURE COMMUNICATION DEVICE

(71) Applicant: Keyssa, Inc., Campbell, CA (US)

(72) Inventors: Gary Davis McCormak, Tigard, OR (US); Ian A. Kyles, West Linn, OR (US)

(73) Assignee: Keyssa, Inc., Campbell, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/862,904

(22) Filed: Jan. 5, 2018

(65) Prior Publication Data

US 2018/0146379 A1 May 24, 2018

Related U.S. Application Data

(63) Continuation of application No. 14/936,877, filed on Nov. 10, 2015, now Pat. No. 9,894,524, which is a
(Continued)

(51) Int. Cl.
*H04L 9/32* (2006.01)
*H04W 12/08* (2009.01)
(Continued)

(52) U.S. Cl.
CPC .............. *H04W 12/08* (2013.01); *H04B 5/02* (2013.01); *H04L 63/0428* (2013.01); *H04L 63/0876* (2013.01); *H04L 63/107* (2013.01)

(58) Field of Classification Search
CPC ....... H04W 12/08; H04B 5/02; H04L 63/0428
(Continued)

(56) References Cited

U.S. PATENT DOCUMENTS

| 2,753,551 A | 7/1956 | Richmond |
| 3,796,831 A | 3/1974 | Bauer |

(Continued)

FOREIGN PATENT DOCUMENTS

| CN | 2237914 Y | 10/1996 |
| CN | 1178402 A | 4/1998 |

(Continued)

OTHER PUBLICATIONS

Akin, D., "802.11i Authentication and Key Management (AKM) White Paper," The CWNP® Program, May 2005, 10 pages, May be retrieved at<URL:https://www.cwnp.com/uploads/802-11i_key_management.pdf>.

(Continued)

*Primary Examiner* — Monjur Rahim
(74) *Attorney, Agent, or Firm* — Fenwick & West LLP

(57) ABSTRACT

A communication device employs a contactless secure communication interface to transmit and receive data with a computing device using close proximity extremely high frequency (EHF) communication. The communication device and the computing device periodically initiate a discovery operation mode, whereby the devices periodically transmit identifying information about the respective devices and listen for identifying information from the other device. Upon completion of the discovery mode operation, the devices enter a link-training operation mode and exchange capability information about the respective devices. During transport mode operation the communication device employs methods to manage access to data stored on the communication device by encrypting the data using one or a combination of training information or capability information as a basis for generating an encryption key.

18 Claims, 7 Drawing Sheets

Related U.S. Application Data continuation of application No. 14/135,458, filed on Dec. 19, 2013, now Pat. No. 9,426,660.

(60) Provisional application No. 61/799,579, filed on Mar. 15, 2013, provisional application No. 61/799,510, filed on Mar. 15, 2013.

(51) Int. Cl.
*H04L 29/06* (2006.01)
*H04B 5/02* (2006.01)

(58) Field of Classification Search
USPC .......................................................... 713/168
See application file for complete search history.

(56) References Cited

U.S. PATENT DOCUMENTS

| | | |
|---|---|---|
| 3,971,930 A | 7/1976 | Fitzmaurice et al. |
| 3,987,365 A | 10/1976 | Okada et al. |
| 4,293,833 A | 10/1981 | Popa |
| 4,485,312 A | 11/1984 | Kusakabe et al. |
| 4,497,068 A | 1/1985 | Fischer |
| 4,525,693 A | 6/1985 | Suzuki et al. |
| 4,694,504 A | 9/1987 | Porter et al. |
| 4,771,294 A | 9/1988 | Wasilousky |
| 4,800,350 A | 1/1989 | Bridges et al. |
| 4,875,026 A | 10/1989 | Walter et al. |
| 4,946,237 A | 8/1990 | Arroyo et al. |
| 5,164,942 A | 11/1992 | Kamerman et al. |
| 5,199,086 A | 3/1993 | Johnson et al. |
| 5,426,563 A | 6/1995 | Moresco et al. |
| 5,471,668 A | 11/1995 | Soenen et al. |
| 5,543,808 A | 8/1996 | Feigenbaum et al. |
| 5,621,913 A | 4/1997 | Tuttle et al. |
| 5,749,052 A | 5/1998 | Hidem et al. |
| 5,754,948 A | 5/1998 | Metze |
| 5,773,878 A | 6/1998 | Lim et al. |
| 5,786,626 A | 7/1998 | Brady et al. |
| 5,861,782 A | 1/1999 | Saitoh |
| 5,921,783 A | 7/1999 | Fritsch et al. |
| 5,941,729 A | 8/1999 | Sri-Jayantha |
| 5,943,374 A | 8/1999 | Kokuryo et al. |
| 5,956,626 A | 9/1999 | Kaschke et al. |
| 6,011,785 A | 1/2000 | Carney |
| 6,072,433 A | 6/2000 | Young et al. |
| 6,252,767 B1 | 6/2001 | Carlson |
| 6,304,157 B1 | 10/2001 | Wada et al. |
| 6,351,237 B1 | 2/2002 | Martek et al. |
| 6,373,447 B1 | 4/2002 | Rostoker et al. |
| 6,490,443 B1 | 12/2002 | Freeny, Jr. |
| 6,492,973 B1 | 12/2002 | Kuroki et al. |
| 6,534,784 B2 | 3/2003 | Eliasson et al. |
| 6,542,720 B1 | 4/2003 | Tandy |
| 6,590,544 B1 | 7/2003 | Filipovic |
| 6,607,136 B1 | 8/2003 | Alsman et al. |
| 6,628,178 B2 | 9/2003 | Uchikoba |
| 6,647,246 B1 | 11/2003 | Lu |
| 6,718,163 B2 | 4/2004 | Tandy |
| 6,768,770 B1 | 7/2004 | Lipperer |
| 6,803,841 B2 | 10/2004 | Saitoh et al. |
| 6,809,899 B1 * | 10/2004 | Chen .............. G11B 5/1278 360/125.09 |
| 6,915,529 B1 | 7/2005 | Suematsu et al. |
| 6,967,347 B2 | 11/2005 | Estes et al. |
| 7,050,763 B2 | 5/2006 | Stengel et al. |
| 7,107,019 B2 | 9/2006 | Tandy |
| 7,113,087 B1 | 9/2006 | Casebolt et al. |
| 7,213,766 B2 | 5/2007 | Ryan et al. |
| 7,311,526 B2 | 12/2007 | Rohrbach et al. |
| 7,379,713 B2 | 5/2008 | Lindstedt |
| 7,509,141 B1 * | 3/2009 | Koenck ............ G06F 13/4256 455/552.1 |
| 7,512,395 B2 | 3/2009 | Beukema et al. |
| 7,517,222 B2 | 4/2009 | Rohrbach et al. |
| 7,561,875 B1 | 7/2009 | Eberle |
| 7,593,708 B2 | 9/2009 | Tandy |
| 7,598,923 B2 | 10/2009 | Hardacker et al. |
| 7,599,427 B2 | 10/2009 | Bik |
| 7,612,630 B2 | 11/2009 | Miller |
| 7,612,674 B2 | 11/2009 | Shintani |
| 7,617,342 B2 | 11/2009 | Rofougaran |
| 7,645,143 B2 | 1/2010 | Rohrbach et al. |
| 7,656,205 B2 | 2/2010 | Chen et al. |
| 7,664,461 B2 | 2/2010 | Rofougaran et al. |
| 7,665,137 B1 | 2/2010 | Barton et al. |
| 7,667,974 B2 | 2/2010 | Nakatani et al. |
| 7,760,045 B2 | 7/2010 | Kawasaki |
| 7,761,092 B2 | 7/2010 | Desch et al. |
| 7,768,457 B2 | 8/2010 | Pettus et al. |
| 7,769,347 B2 | 8/2010 | Louberg et al. |
| 7,778,621 B2 | 8/2010 | Tandy |
| 7,791,167 B1 | 9/2010 | Rofougaran |
| 7,820,990 B2 | 10/2010 | Schroeder et al. |
| 7,840,188 B2 | 11/2010 | Kurokawa |
| 7,865,784 B1 | 1/2011 | White et al. |
| 7,880,677 B2 | 2/2011 | Rofougaran et al. |
| 7,881,675 B1 | 2/2011 | Gazdzinski |
| 7,881,753 B2 | 2/2011 | Rofougaran |
| 7,889,022 B2 | 2/2011 | Miller |
| 7,907,924 B2 | 3/2011 | Kawasaki |
| 7,929,474 B2 | 4/2011 | Pettus et al. |
| 7,975,079 B2 | 7/2011 | Bennett et al. |
| 8,013,610 B1 | 9/2011 | Merewether et al. |
| 8,014,416 B2 | 9/2011 | Ho et al. |
| 8,023,886 B2 | 9/2011 | Rofougaran |
| 8,036,629 B2 | 10/2011 | Tandy |
| 8,041,227 B2 | 10/2011 | Holcombe et al. |
| 8,063,769 B2 | 11/2011 | Rofougaran |
| 8,081,699 B2 | 12/2011 | Siwiak et al. |
| 8,087,939 B2 | 1/2012 | Rohrbach et al. |
| 8,121,542 B2 | 2/2012 | Zack et al. |
| 8,131,645 B2 | 3/2012 | Lin et al. |
| 8,183,935 B2 | 5/2012 | Milano et al. |
| 8,244,175 B2 | 8/2012 | Rofougaran |
| 8,244,179 B2 | 8/2012 | Dua |
| 8,279,611 B2 | 10/2012 | Wong et al. |
| 8,339,258 B2 | 12/2012 | Rofougaran |
| 8,346,847 B2 | 1/2013 | Steakley |
| 8,422,482 B2 | 4/2013 | Sugita |
| 8,554,136 B2 | 10/2013 | McCormack |
| 8,630,588 B2 * | 1/2014 | Liu ..................... H04B 7/0617 370/338 |
| 8,634,767 B2 | 1/2014 | Rofougaran et al. |
| 8,755,849 B2 | 6/2014 | Rofougaran et al. |
| 8,794,980 B2 | 8/2014 | McCormack |
| 8,812,833 B2 | 8/2014 | Liu et al. |
| 8,811,526 B2 | 9/2014 | McCormack et al. |
| 8,939,773 B2 | 1/2015 | McCormack |
| RE45,368 E * | 2/2015 | Orihashi ...................... 375/150 |
| 9,374,154 B2 | 6/2016 | Kyles et al. |
| 9,553,616 B2 | 1/2017 | McCormack |
| 10,033,439 B2 | 7/2018 | McCormack et al. |
| 2002/0008665 A1 | 1/2002 | Takenoshita |
| 2002/0027481 A1 | 3/2002 | Fiedziuszko |
| 2002/0058484 A1 | 5/2002 | Bobier et al. |
| 2002/0097085 A1 | 7/2002 | Stapleton |
| 2002/0106041 A1 | 8/2002 | Chang et al. |
| 2002/0118083 A1 | 8/2002 | Pergande |
| 2002/0140584 A1 | 10/2002 | Maeda et al. |
| 2003/0025626 A1 | 2/2003 | McEwan |
| 2003/0088404 A1 | 5/2003 | Koyanagi |
| 2003/0137371 A1 | 7/2003 | Saitoh et al. |
| 2004/0043734 A1 | 3/2004 | Hashidate |
| 2004/0160294 A1 | 8/2004 | Elco |
| 2004/0214621 A1 | 10/2004 | Ponce De Leon et al. |
| 2005/0032474 A1 | 2/2005 | Gordon |
| 2005/0099242 A1 | 5/2005 | Sano |
| 2005/0109841 A1 | 5/2005 | Ryan et al. |
| 2005/0124307 A1 | 6/2005 | Ammar |
| 2005/0140436 A1 | 6/2005 | Ichitsubo et al. |
| 2005/0191966 A1 | 9/2005 | Katsuta |
| 2005/0259824 A1 | 11/2005 | Isozaki et al. |
| 2006/0003710 A1 | 1/2006 | Nakagawa et al. |

(56) References Cited

U.S. PATENT DOCUMENTS

| | | |
|---|---|---|
| 2006/0017157 A1 | 1/2006 | Yamamoto et al. |
| 2006/0029229 A1 | 2/2006 | Trifonov et al. |
| 2006/0038168 A1 | 2/2006 | Estes et al. |
| 2006/0051981 A1 | 3/2006 | Neidlein et al. |
| 2006/0082518 A1 | 4/2006 | Ram |
| 2006/0128372 A1 | 6/2006 | Gazzola |
| 2006/0140305 A1 | 6/2006 | Netsell et al. |
| 2006/0159158 A1* | 7/2006 | Moore .................. G06F 1/1632 375/130 |
| 2006/0166740 A1 | 7/2006 | Sufuentes |
| 2006/0077043 A1 | 8/2006 | Amtmann et al. |
| 2006/0234787 A1 | 10/2006 | Lee et al. |
| 2006/0258289 A1* | 11/2006 | Dua .................. G06F 17/30058 455/41.3 |
| 2006/0276157 A1 | 12/2006 | Chen et al. |
| 2007/0010295 A1 | 1/2007 | Greene |
| 2007/0024504 A1* | 2/2007 | Matsunaga .............. H01L 23/48 343/700 MS |
| 2007/0035917 A1 | 2/2007 | Hotelling et al. |
| 2007/0063056 A1 | 3/2007 | Gaucher et al. |
| 2007/0070814 A1 | 3/2007 | Frodyma et al. |
| 2007/0108296 A1 | 5/2007 | Konopka et al. |
| 2007/0147425 A1 | 6/2007 | Lamoureux et al. |
| 2007/0229270 A1 | 10/2007 | Rofougaran |
| 2007/0242621 A1 | 10/2007 | Nandagopalan et al. |
| 2007/0273476 A1 | 11/2007 | Yamazaki et al. |
| 2007/0278632 A1 | 12/2007 | Zhao et al. |
| 2007/0285306 A1* | 12/2007 | Julian .................. G01S 13/765 342/118 |
| 2008/0001761 A1 | 1/2008 | Schwarz |
| 2008/0002652 A1 | 1/2008 | Gupta et al. |
| 2008/0055093 A1 | 3/2008 | Shkolnikov et al. |
| 2008/0055303 A1* | 3/2008 | Ikeda .................. G06F 1/1601 345/214 |
| 2008/0089667 A1 | 4/2008 | Grady et al. |
| 2008/0112101 A1 | 5/2008 | McElwee et al. |
| 2008/0142250 A1 | 6/2008 | Tang |
| 2008/0143435 A1 | 6/2008 | Wilson et al. |
| 2008/0150799 A1 | 6/2008 | Hemmi et al. |
| 2008/0150821 A1 | 6/2008 | Koch et al. |
| 2008/0159243 A1 | 7/2008 | Rofougaran |
| 2008/0165002 A1 | 7/2008 | Tsuji |
| 2008/0165065 A1 | 7/2008 | Hill et al. |
| 2008/0192726 A1 | 8/2008 | Mahesh et al. |
| 2008/0195788 A1 | 8/2008 | Tamir et al. |
| 2008/0197973 A1 | 8/2008 | Enguent |
| 2008/0211631 A1 | 9/2008 | Sakamoto |
| 2008/0238632 A1 | 10/2008 | Endo et al. |
| 2008/0289426 A1 | 11/2008 | Kearns et al. |
| 2008/0290959 A1 | 11/2008 | Ali et al. |
| 2008/0293446 A1 | 11/2008 | Rofougaran |
| 2008/0311765 A1 | 12/2008 | Chatterjee et al. |
| 2009/0006677 A1 | 1/2009 | Rofougaran |
| 2009/0009337 A1 | 1/2009 | Rofougaran |
| 2009/0010316 A1 | 1/2009 | Rofougaran |
| 2009/0015353 A1 | 1/2009 | Rofougaran |
| 2009/0028177 A1 | 1/2009 | Pettus et al. |
| 2009/0029659 A1 | 1/2009 | Gonzalez |
| 2009/0033455 A1* | 2/2009 | Strat .................. H04B 1/0458 340/5.1 |
| 2009/0037628 A1 | 2/2009 | Rofougaran |
| 2009/0073070 A1* | 3/2009 | Rofougaran ......... H04B 5/0012 343/793 |
| 2009/0075688 A1 | 3/2009 | Rofougaran |
| 2009/0086844 A1 | 4/2009 | Rofougaran |
| 2009/0089459 A1 | 4/2009 | Jeyaseelan et al. |
| 2009/0091486 A1 | 4/2009 | Wiesbauer et al. |
| 2009/0094247 A1 | 4/2009 | Fredlund et al. |
| 2009/0094506 A1* | 4/2009 | Lakkis .................. H04L 1/1829 714/799 |
| 2009/0098826 A1 | 4/2009 | Zack et al. |
| 2009/0110131 A1 | 4/2009 | Bornhoft et al. |
| 2009/0111390 A1 | 4/2009 | Sutton et al. |
| 2009/0153260 A1 | 6/2009 | Rofougaran |
| 2009/0153428 A1 | 6/2009 | Rofougaran et al. |
| 2009/0175323 A1 | 7/2009 | Chung |
| 2009/0180408 A1 | 7/2009 | Graybeal et al. |
| 2009/0218407 A1 | 9/2009 | Rofougaran |
| 2009/0218701 A1 | 9/2009 | Rofougaran |
| 2009/0236701 A1 | 9/2009 | Sun et al. |
| 2009/0237317 A1 | 9/2009 | Rofougaran |
| 2009/0239392 A1 | 9/2009 | Sumitomo et al. |
| 2009/0239483 A1 | 9/2009 | Rofougaran |
| 2009/0189873 A1 | 10/2009 | Peterson et al. |
| 2009/0245808 A1 | 10/2009 | Rofougaran |
| 2009/0257445 A1 | 10/2009 | Chan et al. |
| 2009/0259865 A1 | 10/2009 | Sheynblat et al. |
| 2009/0280765 A1* | 11/2009 | Rofougaran ......... H04B 17/318 455/226.2 |
| 2009/0280768 A1 | 11/2009 | Rofougaran et al. |
| 2009/0282163 A1 | 11/2009 | Washiro |
| 2009/0310649 A1 | 12/2009 | Fisher et al. |
| 2010/0009627 A1 | 1/2010 | Huomo |
| 2010/0063866 A1 | 3/2010 | Kinoshita et al. |
| 2010/0071031 A1 | 3/2010 | Carter et al. |
| 2010/0103045 A1* | 4/2010 | Liu .................. H04B 7/0617 342/372 |
| 2010/0120406 A1 | 5/2010 | Banga et al. |
| 2010/0127804 A1 | 5/2010 | Vouloumanos |
| 2010/0149149 A1 | 6/2010 | Lawther |
| 2010/0159829 A1 | 6/2010 | McCormack |
| 2010/0167645 A1 | 7/2010 | Kawashimo |
| 2010/0167666 A1* | 7/2010 | Choudhury ....... H01L 23/49822 455/90.2 |
| 2010/0202345 A1 | 8/2010 | Jing et al. |
| 2010/0202499 A1 | 8/2010 | Lee et al. |
| 2010/0203833 A1 | 8/2010 | Dorsey |
| 2010/0231452 A1 | 9/2010 | Babakhani et al. |
| 2010/0260274 A1 | 10/2010 | Yamada et al. |
| 2010/0265648 A1 | 10/2010 | Hirabayashi |
| 2010/0277394 A1 | 11/2010 | Haustein et al. |
| 2010/0282849 A1 | 11/2010 | Mair |
| 2010/0283700 A1 | 11/2010 | Rajanish et al. |
| 2010/0285634 A1 | 11/2010 | Rofougaran |
| 2010/0289591 A1 | 11/2010 | Garcia |
| 2010/0297954 A1* | 11/2010 | Rofougaran ........... H01L 23/66 455/73 |
| 2010/0315954 A1 | 12/2010 | Singh et al. |
| 2011/0009078 A1 | 1/2011 | Kawamura |
| 2011/0012727 A1 | 1/2011 | Pance et al. |
| 2011/0038282 A1 | 2/2011 | Mihota et al. |
| 2011/0044404 A1 | 2/2011 | Vromans |
| 2011/0047588 A1 | 2/2011 | Takeuchi et al. |
| 2011/0050446 A1 | 3/2011 | Anderson et al. |
| 2011/0079650 A1* | 4/2011 | Kobayashi ............. G06K 19/07 235/492 |
| 2011/0084398 A1 | 4/2011 | Pilard et al. |
| 2011/0092212 A1 | 4/2011 | Kubota |
| 2011/0122932 A1 | 5/2011 | Lovberg |
| 2011/0127954 A1 | 6/2011 | Walley et al. |
| 2011/0143692 A1* | 6/2011 | Sofer .................. H04B 7/0608 455/88 |
| 2011/0171837 A1 | 7/2011 | Hardisty et al. |
| 2011/0181484 A1 | 7/2011 | Pettus et al. |
| 2011/0197237 A1 | 8/2011 | Turner |
| 2011/0207425 A1 | 8/2011 | Juntunen et al. |
| 2011/0221582 A1 | 9/2011 | Chuey et al. |
| 2011/0249659 A1 | 10/2011 | Fontaine et al. |
| 2011/0250928 A1 | 10/2011 | Schlub et al. |
| 2011/0285606 A1 | 11/2011 | De Graauw et al. |
| 2011/0286703 A1 | 11/2011 | Kishima et al. |
| 2011/0292972 A1 | 12/2011 | Budianu et al. |
| 2011/0311231 A1 | 12/2011 | Ridgway et al. |
| 2012/0009880 A1 | 1/2012 | Trainin et al. |
| 2012/0013499 A1 | 1/2012 | Hayata |
| 2012/0028582 A1 | 2/2012 | Tandy |
| 2012/0064664 A1 | 3/2012 | Yamazaki et al. |
| 2012/0069772 A1 | 3/2012 | Byrne et al. |
| 2012/0072620 A1 | 3/2012 | Jeong et al. |
| 2012/0082194 A1 | 4/2012 | Tam et al. |
| 2012/0083137 A1 | 4/2012 | Rohrbach et al. |
| 2012/0091799 A1 | 4/2012 | Rofougaran et al. |
| 2012/0110635 A1 | 5/2012 | Harvey et al. |

(56) References Cited

U.S. PATENT DOCUMENTS

| | | | |
|---|---|---|---|
| 2012/0126794 A1 | 5/2012 | Jensen et al. | |
| 2012/0139768 A1 | 6/2012 | Loeda et al. | |
| 2012/0219039 A1 | 8/2012 | Feher | |
| 2012/0249366 A1 | 10/2012 | Pozgay et al. | |
| 2012/0263244 A1 | 10/2012 | Kyles et al. | |
| 2012/0265596 A1 | 10/2012 | Mazed et al. | |
| 2012/0286049 A1 | 11/2012 | McCormack et al. | |
| 2012/0290760 A1 | 11/2012 | McCormack et al. | |
| 2012/0295539 A1 | 11/2012 | McCormack et al. | |
| 2012/0307932 A1 | 12/2012 | McCormack et al. | |
| 2012/0319496 A1 | 12/2012 | McCormack et al. | |
| 2012/0319890 A1 | 12/2012 | McCormack et al. | |
| 2013/0070817 A1 | 3/2013 | McCormack et al. | |
| 2013/0106673 A1 | 5/2013 | McCormack et al. | |
| 2013/0109303 A1 | 5/2013 | McCormack et al. | |
| 2013/0148517 A1* | 6/2013 | Abraham | H04B 7/12 370/252 |
| 2013/0157477 A1 | 6/2013 | McCormack | |
| 2013/0183903 A1 | 7/2013 | McCormack et al. | |
| 2013/0196598 A1 | 8/2013 | McCormack et al. | |
| 2013/0223251 A1* | 8/2013 | Li | H04W 72/046 370/252 |
| 2013/0257670 A1 | 10/2013 | Sovero et al. | |
| 2013/0278360 A1 | 10/2013 | Kim et al. | |
| 2013/0286960 A1* | 10/2013 | Li | H04W 72/042 370/329 |
| 2013/0316653 A1 | 11/2013 | Kyles et al. | |
| 2014/0038521 A1* | 2/2014 | McCormack | H04B 5/02 455/41.1 |
| 2014/0043208 A1 | 2/2014 | McCormack et al. | |
| 2014/0094207 A1* | 4/2014 | Amizur | H04W 72/044 455/509 |
| 2014/0148193 A1 | 5/2014 | Kogan et al. | |
| 2014/0162681 A1* | 6/2014 | Noonan | H04W 4/021 455/456.1 |
| 2014/0253295 A1 | 9/2014 | Roberts et al. | |
| 2014/0266331 A1 | 9/2014 | Arora | |
| 2014/0269414 A1 | 9/2014 | Hyde et al. | |
| 2015/0111496 A1 | 4/2015 | McCormack et al. | |

FOREIGN PATENT DOCUMENTS

| | | |
|---|---|---|
| CN | 1195908 A | 10/1998 |
| CN | 2313296 Y | 4/1999 |
| CN | 1257321 A | 6/2000 |
| CN | 1282450 A | 1/2001 |
| CN | 1359582 A | 7/2002 |
| CN | 1371537 A | 9/2002 |
| CN | 1389988 A | 1/2003 |
| CN | 1620171 A | 5/2005 |
| CN | 1665151 A | 9/2005 |
| CN | 1695275 A | 11/2005 |
| CN | 1781255 A | 5/2006 |
| CN | 1812254 A | 8/2006 |
| CN | 101090179 A | 12/2007 |
| CN | 101496298 A | 7/2009 |
| CN | 101681186 A | 3/2010 |
| CN | 101785124 A | 7/2010 |
| CN | 201562854 U | 8/2010 |
| CN | 101908903 A | 12/2010 |
| CN | 102024290 A | 4/2011 |
| CN | 102156510 A | 8/2011 |
| CN | 102187714 A | 9/2011 |
| CN | 102308528 A | 1/2012 |
| CN | 102333127 A | 1/2012 |
| CN | 102395987 A | 3/2012 |
| CN | 102420640 A | 4/2012 |
| CN | 104937956 A | 9/2015 |
| EP | 0152246 A2 | 8/1985 |
| EP | 0 515 187 A2 | 11/1992 |
| EP | 0789421 A2 | 8/1997 |
| EP | 0884799 A2 | 12/1998 |
| EP | 0896380 A2 | 2/1999 |
| EP | 0996189 A2 | 4/2000 |
| EP | 1041666 A1 | 10/2000 |
| EP | 1 298 809 A2 | 4/2003 |
| EP | 1357395 A1 | 10/2003 |
| EP | 1798867 A2 | 6/2007 |
| EP | 2106192 A2 | 9/2009 |
| EP | 2 309 608 A1 | 4/2011 |
| EP | 2328226 A1 | 6/2011 |
| EP | 2 360 923 A1 | 8/2011 |
| GB | 817349 | 7/1959 |
| GB | 2217114 | 10/1989 |
| JP | 52-72502 A | 6/1977 |
| JP | 5-236031 A | 9/1993 |
| JP | 5-327788 A | 12/1993 |
| JP | 07-006817 A | 1/1995 |
| JP | 9-83538 A | 3/1997 |
| JP | 10-13296 A | 1/1998 |
| JP | H10-065568 A | 3/1998 |
| JP | H11-298343 A | 10/1999 |
| JP | 2000-022665 A | 1/2000 |
| JP | 2001-153963 A | 6/2001 |
| JP | 2001-326506 A | 11/2001 |
| JP | 2002-185476 A | 6/2002 |
| JP | 2002-203730 A | 7/2002 |
| JP | 2002-261514 A | 9/2002 |
| JP | 2002-265729 A | 9/2002 |
| JP | 2003-209511 A | 7/2003 |
| JP | 2004-505505 A | 2/2004 |
| JP | 2005-117153 A | 4/2005 |
| JP | 2008-022247 A | 1/2008 |
| JP | 2008-079241 | 4/2008 |
| JP | 2008-124917 A | 5/2008 |
| JP | 2008-129919 A | 6/2008 |
| JP | 2008-250713 A | 10/2008 |
| JP | 2008 252566 A | 10/2008 |
| JP | 2009-231114 | 7/2009 |
| JP | 2009-239842 A | 10/2009 |
| JP | 2010-509834 A | 3/2010 |
| JP | 2010-183055 A | 8/2010 |
| JP | 2010-531035 A | 9/2010 |
| JP | 2011-022640 A | 2/2011 |
| JP | 2011-41078 A | 2/2011 |
| JP | 2011-044944 A | 3/2011 |
| JP | 2011-176672 A | 9/2011 |
| JP | 2011-244179 A | 12/2011 |
| JP | 2014-516221 | 7/2014 |
| TW | 493369 | 7/2002 |
| TW | 200520434 A | 6/2005 |
| TW | 200810444 A | 2/2008 |
| TW | 200828839 A | 7/2008 |
| TW | 200906011 A | 2/2009 |
| TW | 201249293 A1 | 12/2012 |
| WO | WO 97/32413 A | 9/1997 |
| WO | WO 2006/133108 A2 | 12/2006 |
| WO | WO 2009/113373 A1 | 9/2009 |
| WO | WO 2011/114737 A1 | 9/2011 |
| WO | WO 2011/114738 A1 | 9/2011 |
| WO | WO 2012/129426 A3 | 9/2012 |
| WO | WO 2012/154550 A1 | 11/2012 |
| WO | WO 2012/155135 A3 | 11/2012 |
| WO | WO 2012/166922 A1 | 12/2012 |
| WO | WO 2012/174350 A1 | 12/2012 |
| WO | WO 2013/006641 A3 | 1/2013 |
| WO | WO 2013/040396 A1 | 3/2013 |
| WO | WO 2013/059801 A1 | 4/2013 |
| WO | WO 2013/059802 A1 | 4/2013 |
| WO | WO 2013/090625 A1 | 6/2013 |
| WO | WO 2013/130486 A1 | 9/2013 |
| WO | WO 2013/131095 A1 | 9/2013 |
| WO | WO 2013/134444 A1 | 9/2013 |
| WO | WO 2014/026191 A1 | 2/2014 |

OTHER PUBLICATIONS

Bluetooth Audio Dongle Receiver 3.5mm Stereo, Feb. 8, 2013.
Bluetooth Headset, Jabra clipper, Jul. 28, 2010.
Chinese Office Action, Chinese Application No. 201280025060.8, dated Oct. 30, 2014, 8 pages (with concise explanation of relevance).

(56) References Cited

OTHER PUBLICATIONS

Chinese Second Office Action, Chinese Application No. 201280025060.8, dated Jun. 11, 2015, 8 pages.
Chinese First Office Action, Chinese Application 201280043190.4, dated Jan. 21, 2015, 18 pages.
Chinese Second Office Action, Chinese Application No. 201280043190.4, dated Oct. 26, 2015, 5 pages.
Chinese First Office Action, Chinese Application No. 201280038180.1, dated Dec. 1, 2015, 16 pages.
Chinese Third Office Action, Chinese Application No. 201280025060.8, dated Dec. 28, 2015, 6 pages.
Chinese First Office Action, Chinese Application No. 201280062118.6, dated Jan. 5, 2016, 15 pages.
Chinese First Office Action, Chinese Application No. 201380055859.6, dated Jan. 20, 2016, 5 pages.
Chinese First Office Action, Chinese Application No. 201380048407.5, dated Feb. 3, 2016, 14 pages.
Chinese First Office Action, Chinese Application No. 201380023102.9, dated Jun. 14, 2016, 13 pages (with concise explanation of relevance).
Chinese Fourth Office Action, Chinese Application No. 201280025060.8, dated Jun. 17, 2016, 9 pages.
Chinese Second Office Action, Chinese Application No. 201280038180.1, dated Aug. 18, 2016, 9 pages (with concise explanation of relevance).
Chinese Second Office Action, Chinese Application No. 201280062118.6, dated Sep. 6, 2016, 4 pages (with concise explanation of relevance).
Chinese First Office Action, Chinese Application No. 201380071296.X, dated Sep. 2, 2016, 24 pages (with concise explanation of relevance).
Chinese First Office Action, Chinese Application No. 201480024681.3, dated Nov. 4, 2016, 10 pages.
Chinese Second Office Action, Chinese Application No. 201380048407.5, dated Nov. 22, 2016, 11 pages (with concise explanation of relevance).
Chinese Third Office Action, Chinese Application No. 201280038180.1, dated Dec. 2, 2016, 9 pages (with concise explanation of relevance).
Chinese Rejection Decision, Chinese Application No. 201280025060.8, dated Feb. 14, 2017, 11 pages.
Chinese Second Office Action, Chinese Application No. 201380023102.9, dated Mar. 1, 2017, 6 pages.
Chinese Third Office Action, Chinese Application No. 201280062118.6, dated Mar. 17, 2017, 6 pages.
Chinese Second Office Action, Chinese Application No. 201380071296.X, dated May 4, 2017, 20 pages.
Chinese Third Office Action, Chinese Application No. 201380048407.5, dated Jun. 27, 2017, 6 pages.
Chinese Third Office Action, Chinese Application No. 201380071296.X, dated Nov. 6, 2017, 6 pages.
Chinese First Office Action, Chinese Application No. 201380069854.9, dated Nov. 29, 2017, 7 pages (with concise explanation of relevance).
Chinese Fourth Office Action, Chinese Application No. 2013800484075, dated Dec. 22, 2017, 6 pages.
Chinese First Office Action, Chinese Application No. 201610696638.2, dated Mar. 27, 2018, 9 pages.
Chinese Fifth Office Action, Chinese Application No. 201280025060.8, dated Apr. 9, 2018, 4 pages (with concise explanation of relevance).
Chinese Fourth Office Action, Chinese Application No. 201380071296.X, dated Apr. 16, 2018, 4 pages (with concise explanation of relevance).
ECMA Standard: "Standard ECMA-398: Close Proximity Electric Induction Wireless Communications," Jun. 1, 2011, pp. 1-100, May be retrieved from the Internet<URL:http://www.ecma-international.org/publications/standards/Ecma- 398.htm>.
Enumeration: How the Host Learns about Devices, Jan Axelson's Lakeview Research.
European Examination Report, European Application No. 13711499.7, dated Oct. 5, 2015, 8 pages.
European Examination Report, European Application No. 13821032.3, dated Apr. 4, 2016, 3 pages.
European Communication Under Rule 164(2)(a) EPC, European Application No. 14726242.2, dated Jul. 11, 2016, 3 pages.
European Extended Search Report, European Application No. 13879021.7, dated Oct. 17, 2016, 6 pages.
European Communication About Intention to Grant a European Patent Including Search Results, European Application No. 14726242, dated Nov. 30, 2016, 9 pages.
European Examination Report, European Application No. 12808634.5, dated May 31, 2017, 10 pages.
European Examination Report, European Application No. 13821246.9, dated Oct. 18, 2017, 6 pages.
European Examination Report, European Application No. 12726996.7, dated Mar. 5, 2018, 9 pages.
European Examination Report, European Application No. 13821246.9, dated Mar. 7, 2018, 4 pages.
Future Technology Devices Interntional Limited (FTDI) "Technical Note TN_I 13 Simplified Description ofUSB Device Enumeration", Doc. Ref. No. FT_000180, Version 1.0, Issue Date Oct. 28, 2009, 19 pages.
Goldstone, L. L. "MM Wave Transmission Polarizer", International Symposium Digest—Antennas & Propagation vol. 2, Jun. 1979, 5 pages.
Ingerski, J. et al., "Mobile Tactile Communications, The Role of the UHF Follow-On Satellite Constellation and Its Successor, Mobile User Objective System," IEEE, 2002, pp. 302-306.
Japanese Office Action, Japanese Patent Office, "Notice of Reasons for Rejection" in connection with related Japanese Patent Application No. 2014-501249, dated Jul. 22, 2014, 7 pages.
Japanese Office Action, Japanese Application No. 2014-513697, dated Jan. 20, 2015, 7 pages.
Japanese Office Action, Japanese Application No. 2014-519270, dated Mar. 9, 2015, 17 pages.
Japanese Office Action, Japanese Application No. 2014-547442, dated May 25, 2015, 7 pages.
Japanese Office Action, Japanese Application No. 2015-004839, dated Aug. 10, 2015, 12 pages.
Japanese Office Action, Japanese Application No. 2014-513697, dated Nov. 2, 2015, 5 pages.
Japanese Office Action, Japanese Application No. 2014/547442, dated Mar. 14, 2016, 8 pages.
Japanese Office Action, Japanese Application No. 2015-004839, dated May 16, 2016, 10 pages.
Japanese Office Action, Japanese Application No. 2014-547442, dated Oct. 24, 2016, 5 pages.
Japanese Office Action, Japanese Application No. 2014-547442, dated Feb. 26, 2018, 11 pages.
Juntunen, E. A , "60 GHz CMOS Pico-Joule/Bit Oook Receiver Design for Multi-Gigabit Per Second Wireless Communications" thesis paper, Aug. 2008, 52 pages.
Korean Office Action, Korean Application No. 10-2013-7027865, dated Oct. 22, 2014, 12 pages.
Korean Office Action, Korean Application No. 10-2013-7027865, dated Apr. 13, 2015, 8 pages.
Korean Office Action, Korean Application No. 10-2015-7029405, dated Jul. 19, 2016, 4 pages (with concise explanation of relevance).
Korean Office Action, Korean Application No. 10-2017-7001850, dated Sep. 22, 2017, 7 pages.
Korean Second Office Action, Korean Application No. 10-2017-7001850, dated Mar. 16, 2018, 4 pages (with concise explanation of relevance).
Li, X. et al., "Space-Time Transmissions for Wireless Secret-Key Agreement with Information-Theoretic Secrecy," IEEE, 2003, pp. 1-5.
Office of Engineering and Technology Federal Communications Commission, "Understanding the FCC Regulations for Low-Power, Non-Licensed Transmitters", OET Bulletin No. 63, Oct. 1993, 34 pages.
PCM510x 2VRMS DirectPath™, 112/106/IOOdB Audio Stereo DAC with 32-bit, 384kHz PCM Interface by Texas Instruments.

(56) References Cited

OTHER PUBLICATIONS

PCT International Search Report, PCT Patent Application No. PCT/US2013/027835, dated May 3, 2013, 4 pages.
PCT Written Opinion, PCT Patent Application No. PCT/US2013/027835, dated May 3, 2013, 8 pages.
PCT International Search Report, PCT Patent Application No. PCT/US2013/029469, dated Jun. 6, 2013, 5 pages.
PCT Written Opinion, PCT Patent Application No. PCT/US2013/029469, dated Jun. 6, 2013, 5 pages.
PCT International Search Report, PCT Patent Application No. PCT/US2013/023665, dated Jun. 20, 2013, 5 pages.
PCT Written Opinion, PCT Patent Application No. PCT/US2013/023665, dated Jun. 20, 2013, 10 pages.
PCT International Search Report, PCT Patent Application No. PCT/US2012/040214, dated Aug. 21, 2012, 3 pages.
PCT Written Opinion, PCT Patent Application No. PCT/US2012/040214, dated Aug. 21, 2012, 8 pages.
PCT International Search Report, PCT Patent Application No. PCT/US2012/042616, dated Oct. 1, 2012, 4 pages.
PCT Written Opinion, PCT Patent Application No. PCT/US2012/042616, dated Oct. 1, 2012, 10 pages.
PCT International Search Report, PCT Patent Application No. PCT/US2012/030166, dated Oct. 31, 2010, 6 pages.
PCT Written Opinion, PCT Patent Application No. PCT/US2012/030166, dated Oct. 31, 2010, 9 pages.
PCT International Search Report, PCT Patent Application No. PCT/US2012/055488, dated Dec. 13, 2012, 4 pages.
PCT Written Opinion, PCT Patent Application No. PCT/US2012/055488, dated Dec. 13, 2012, 8 pages.
PCT International Search Report, PCT Patent Application No. PCT/US2012/045444, dated Jan. 21, 2013, 7 pages.
PCT Written Opinion, PCT Patent Application No. PCT/US2012/045444, dated Jan. 21, 2013, 9 pages.
PCT International Search Report, PCT Patent Application No. PCT/US2012/037795, dated Jan. 21, 2013, 7 pages.
PCT Written Opinion, PCT Patent Application No. PCT/US2012/037795, dated Jan. 21, 2013, 12 pages.
PCT International Search Report, PCT Patent Application No. PCT/US2012/061345, dated Jan. 24, 2013, 4 pages.
PCT Written Opinion, PCT Patent Application No. PCT/US2012/061345, dated Jan. 24, 2013, 7 pages.
PCT International Search Report, PCT Patent Application No. PCT/US2012/061346, dated Jan. 24, 2013, 5 pages.
PCT Written Opinion, PCT Patent Application No. PCT/US2012/061346, dated Jan. 24, 2013, 9 pages.
PCT International Search Report, PCT Patent Application No. PCT/US2012/069576, dated May 2, 2013, 3 pages.
PCT Written Opinion, PCT Patent Application No. PCT/US2012/069576, dated May 2, 2013, 13 pages.
PCT International Search Report, PCT Patent Application No. PCT/US2013/028896, dated Sep. 26, 2013, 4 pages.
PCT Written Opinion, PCT Patent Application No. PCT/US2013/028896, dated Sep. 26, 2013, 4 pages.
PCT International Search Report, PCT Patent Application No. PCT/US2013/046631, dated Sep. 20, 2013, 4 pages.
PCT Written Opinion, PCT Patent Application No. PCT/US2013/046631, dated Sep. 20, 2013, 6 pages.
PCT International Search Report, PCT Patent Application No. PCT/US2013/054292, dated Nov. 29, 2013, 4 pages.
PCT Written Opinion, PCT Patent Application No. PCT/US2013/054292, dated Nov. 29, 2013, 7 pages.
PCT International Search Report and Written Opinion, PCT Application No. PCT/US2014/024027, dated Jul. 21, 2014, 15 pages.
PCT International Search Report, PCT Application No. PCT/US2013/075222, dated Jul. 17, 2014, 4 pages.
PCT Written Opinion, PCT Application No. PCT/US2013/075222, dated Jul. 17, 2014, 8 pages.
PCT International Search Report, PCT Application No. PCT/US2013/075892, dated Apr. 23, 2014, 4 pages.
PCT Written Opinion, PCT Application No. PCT/US2013/075892, dated Apr. 23, 2014, 8 pages.
PCT International Search Report and Written Opinion, PCT Application No. PCT/US2013/033394, dated Aug. 8, 2013, 10 pages.
PCT International Search Report and Written Opinion, PCT Application No. PCT/US2013/055487, dated Jan. 24, 2014, 9 pages.
PCT International Search Report and Written Opinion, PCT Application No. PCT/US2013/076687, dated May 21, 2014, 20 pages.
PCT International Search Report and Written Opinion, PCT Application No. PCT/US2014/030115, dated Sep. 22, 2014, 15 pages.
PCT International Search Report and Written Opinion, PCT Application No. PCT/US2013/059811, dated Dec. 2, 2013, 11 pages.
Philips, I2S Bus Specification, Jun. 5, 1996.
RF Power Amplifier, Mar. 22, 2008, 1 page, May be Retrieved at <http://en.wikipedia.org/wiki/RF_power_amplifier>.
Silicon Labs USB-to-12S Audio Bridge Chip Brings Plug-and-Play Simplicity to Audio Design, Cision Wire, Feb. 4, 2013.
Taiwan Office Action, Taiwan Application No. 101110057, dated Mar. 23, 2016, 7 pages.
Taiwan Office Action, Taiwan Application No. 101147406, dated Mar. 23, 2016, 6 pages.
Taiwan Office Action, Taiwan Application No. 101119491, dated May 9, 2016, 9 pages.
Taiwan Office Action, Taiwan Application No. 101138870, dated Jun. 13, 2016, 8 pages.
Taiwan Office Action, Taiwan Application No. 101121492, dated Jul. 28, 2016, 11 pages.
Taiwan Office Action, Taiwan Application No. 101124197, dated Oct. 17, 2016, 8 pages.
Taiwan Office Action, Taiwan Application No. 102128612, dated Jan. 10, 2017, 10 pages.
Taiwan Office Action, Taiwan Application No. 105143334, dated Aug. 29, 2017, 17 pages.
Taiwan Office Action, Taiwan Application No. 105134730, dated Sep. 25, 2017, 5 pages.
Taiwan Office Action, Taiwan Application No. 101121492, dated Feb. 9, 2018, 8 pages
Taiwan Office Action, Taiwan Application No. 105139861, dated Dec. 11, 2017, 6 pages.
TN21065L_I2S, Interfacing I2S-Compatible Audio Devices to The ADSP-21065L Serial Ports, Apr. 1999.
USB in a NutShell . . . (43 pages).
USB Made Simple, MQP Electronics Ltd, 2006-2008 (78 pages).
"Understanding the FCC Regulations for Low-Power Non-Licensed Transmitters", Office of Engineering and Technology, Federal Communications Commission, OET Bulletin No. 63, Oct. 1993.
Universal Serial Bus, Wikipedia, 2012 (32 pages).
Vahle Electrification Systems, "CPS Contactless Power System", Catalog No. 9d/E, 2004, 12 pages.
Wireless HD: "WirelessHD Specification Version 1.1 Overview," May 1, 2010, pp. 1-95, May be retrieved from the Internet<URL:http://www.wirelesshd.org/pdfs/WirelessHD-Specification-Overview-v1.1May2010.pdf>.
United States Office Action, U.S. Appl. No. 13/485,306, dated Sep. 26, 2013, 11 pages.
United States Office Action, U.S. Appl. No. 13/541,543, dated Feb. 12, 2015, 25 pages.
United States Office Action, U.S. Appl. No. 13/541,543, dated Oct. 28, 2014, 42 pages.
United States Office Action, U.S. Appl. No. 13/427,576, dated Oct. 30, 2014, 6 pages.
United States Office Action, U.S. Appl. No. 13/524,956, dated Feb. 9, 2015, 17 pages.
United States Office Action, U.S. Appl. No. 13/524,963, dated Mar. 17, 2014, 14 pages.
United States Office Action, U.S. Appl. No. 13/657,482, dated Jan. 2, 2015, 29 pages.
United States Office Action, U.S. Appl. No. 12/655,041, dated Jun. 7, 2013, 9 pages.
United States Office Action, U.S. Appl. No. 14/047,924, dated Dec. 19, 2014, 8 pages.
United States Office Action, U.S. Appl. No. 14/047,924, dated Feb. 27, 2014, 9 pages.

(56) References Cited

OTHER PUBLICATIONS

United States Office Action, U.S. Appl. No. 13/784,396, dated Sep. 11, 2014, 7 pages.
United States Office Action, U.S. Appl. No. 13/760,089, dated Jul. 7, 2014, 14 pages.
United States Office Action, U.S. Appl. No. 14/596,172, dated Feb. 10, 2015, 7 pages.
United States Office Action, U.S. Appl. No. 14/462,560, dated Feb. 13, 2015, 12 pages.
United States Office Action, U.S. Appl. No. 14/026,913, dated Feb. 25, 2015, 15 pages.
United States Office Action, U.S. Appl. No. 14/135,458, dated Apr. 13, 2015, 13 pages.
United States Office Action, U.S. Appl. No. 13/541,543, dated May 28, 2015, 17 pages.
United States Office Action, U.S. Appl. No. 14/047,924, dated May 21, 2015, 6 pages.
United States Office Action, U.S. Appl. No. 14/026,913, dated Jun. 5, 2015, 16 pages.
United States Office Action, U.S. Appl. No. 13/922,062, dated Jul. 23, 2015, 10 pages.
United States Office Action, U.S. Appl. No. 13/963,199, dated Jul. 27, 2015, 9 pages.
United States Office Action, U.S. Appl. No. 14/109,938, dated Aug. 14, 2015, 12 pages.
United States Office Action, U.S. Appl. No. 14/026,913, dated Sep. 18, 2015, 9 pages.
United States Office Action, U.S. Appl. No. 13/657,482, dated Sep. 22, 2015, 24 pages.
United States Office Action, U.S. Appl. No. 14/215,069, dated Oct. 30, 2015, 15 pages.
United States Office Action, U.S. Appl. No. 14/047,924, dated Nov. 18, 2015, 7 pages.
United States Office Action, U.S. Appl. No. 14/881,901, dated Dec. 17, 2015, 15 pages.
United States Office Action, U.S. Appl. No. 13/541,543, dated Dec. 21, 2015, 20 pages.
United States Office Action, U.S. Appl. No. 14/936,877, dated Mar. 23, 2016, 15 pages.
United States Office Action, U.S. Appl. No. 14/106,765, dated Jun. 9, 2016, 10 pages.
United States Office Action, U.S. Appl. No. 13/963,199, dated Jun. 1, 2016, 8 pages.
United States Office Action, U.S. Appl. No. 15/144,756, dated Jun. 16, 2016, 12 pages.
United States Office Action, U.S. Appl. No. 14/047,924, dated Aug. 11, 2016, 7 pages.
United States Office Action, U.S. Appl. No. 15/204,988, dated Aug. 31, 2016, 10 pages.
United States Office Action, U.S. Appl. No. 14/936,877, dated Oct. 4, 2016, 11 pages.
United States Examiner's Answer to Appeal, U.S. Appl. No. 13/541,543, filed Oct. 7, 2016, 26 pages.
United States Advisory Action, U.S. Appl. No. 14/936,877, dated Dec. 6, 2016, 6 pages.
United States Office Action, U.S. Appl. No. 14/106,765, dated Dec. 22, 2016, 13 pages.
United States Office Action, U.S. Appl. No. 14/047,924, dated Feb. 27, 2017, 8 pages.
United States Office Action, U.S. Appl. No. 15/290,342, dated Jun. 6, 2016, 8 pages.
United States Office Action, U.S. Appl. No. 14/106,765, dated Jul. 7, 2017, 11 pages.
United States Office Action, U.S. Appl. No. 15/406,543, dated Oct. 30, 2017, 8 pages.
United States Office Action, U.S. Appl. No. 14/106,765, dated Mar. 9, 2018, 14 pages.
Chinese First Office Action, Chinese Application No. 201380076188.1, dated Mar. 30, 2018, 10 pages (with concise explanation of relevance).
Chinese First Office Action, Chinese Application No. 201710631303.7, dated Sep. 19, 2018, 9 pages (with concise explanation of relevance).
European Examination Report, European Application No. 13821246.9, dated Jul. 24, 2018, 4 pages.
United States Office Action, U.S. Appl. No. 15/679,125, dated Jan. 12, 2018, 7 pages.
Chinese Second Office Action, Chinese Application No. 201380069854.9, dated Oct. 18, 2018, 7 pages.
European Patent Office, Communication pursuant to Article 94(3) EPC, EP Patent Application No. 12714432.7, dated Apr. 10, 2019, six pages.
Korean Office Action, Korean Application No. 10-2014-7016323, dated Nov. 20, 2018, 19 pages.

* cited by examiner

EHF SECURE COMMUNICATION DEVICE

CROSS REFERENCE TO RELATED APPLICATIONS

This application is a continuation of U.S. application Ser. No. 14/936,877, filed Nov. 10, 2015, which is a continuation of U.S. application Ser. No. 14/135,458, filed Dec. 19, 2013, and entitled "EHF Secure Communication Device," which claims the benefit of U.S. Provisional Patent Application No. 61/799,579, filed on Mar. 15, 2013, and U.S. Provisional Patent Application No. 61/799,510, filed on Mar. 15, 2013, each of which is incorporated by reference in their entirety.

BACKGROUND

1. Technical Field

This disclosure relates an electronic communication device with a secure contactless communication interface.

2. Description of the Related Arts

Advances in electronic communication device technology have produced smaller devices with increased storage capacity, and faster transfer rates. Similar gains, however, have not been realized in the connectivity technology to transfer data to and from these devices. For example, a portable data card, such as a Secure Digital (SD) card, is now equipped with communication functionality and utilizes mechanical connectors to deliver a transfer rate of around 20 MB/s.

Transfer rate for portable data cards or storage devices like SD cards is often limited by the connection interface and the power required to transfer data. Transfer rate also provides a practical limitation on the storage capacity because at some point it becomes impractical to wait for a large amount of data to be transferred over a low data rate interface. Existing contact-based connectors may limit the form factor, transfer rates, ESD capabilities, and device ruggedness. Other connection interface technologies utilize wireless broadcasting methods to improve data transfer rate. Broadcasting techniques, however, may compromise the security of the data transfer.

SUMMARY

Embodiments include a device and an approach for managing access to information stored on a communication device over a contactless secure communication interface by using a communication interface configured to transmit and receive data using close proximity extremely high frequency (EHF) communication. The communication device periodically initiates a discovery operation mode, whereby the communication device periodically monitors to detect identifying information from an EHF transmission received from a computing device or another communication device. The communication device also periodically initiates a discovery mode, whereby the computing device periodically transmits indentifying information to the computing device. In one embodiment, the identifying information includes a beacon transmission (e.g., a series of unencoded or encoded pulses). When the communication device detects the identifying information from the computing device, the communication device transmits identifying information about the communication device to the computing device. The computing device, in turn, when detecting the identifying information received from the communication device, transitions from the discovery mode to a link-training mode. Subsequently, the communication device also enters the link-training mode.

During the link-training mode, the communication device and the computing device monitor whether a link-training pattern is received from the computing device and the communication device, respectively. In one implementation, the transmitting device sends a specified data pattern to enable the receiving device to optimize receiver settings (e.g., signal levels, amplification, or other signal conditioning techniques). The receiving device, in turn, enters a learning mode and sends an acknowledgement to the transmitting device when the receiving device completes training. In one embodiment, the receiving device exits the learning mode when a threshold number of training cycles have been received by the receiving device. When the receiving device has not received a threshold number of training cycles within a specified time period (e.g., 100 ms), the receiving device sends a message to the transmitting device indicating that link-training has not been completed.

The link-training pattern is a data pattern that is suitable to enable the communication device and the computing device to determine settings sufficient to receive and detect information provided by the transmitting device (i.e., the computing device or the communication device). In one example, the data pattern is 1 μs of alternating "1" and "0" levels followed by an idle level, changing every third period of a reference clock coupled to the transmitter circuit 305 and the receiver circuit 310. In another example, the link-training pattern may use multiple EHF levels or codings in addition to idle levels to determine the settings. The reference clock may be of any suitable clock frequency (e.g., 266 MHz) sufficient to exchange information between the communication device 100 and the computing device 300. In one embodiment, the receiving device operating in link-training mode evaluates attributes of the received training pattern to determine whether the communication link between the transmitting and the receiving device is suitable to exchange information between the two devices. For example, in one embodiment, the receiving device operating in link-training mode qualifies the strength of the received training pattern to determine whether proximity between the devices satisfies a threshold distance.

In one embodiment, upon completion of the link-training period, the communication device and the computing device will exchange capability information about the respective devices, including, for example, device type, transport mode, vendor information, protocol information, and authentication information (e.g., encryption information). When received, the receiving device validates the capability information against its own capability information (e.g., transport mode capabilities), and transitions to a transport mode to exchange information between the two devices. In one embodiment, during transport mode the communication device employs methods to manage access to data stored on the communication device. In one example, the communication device employs an authentication protocol using a portion of the capability, information or attributes of one or a combination of received or transmitted EHF information.

The features and advantages described in the specification are not all inclusive and, in particular, many additional features and advantages will be apparent to one of ordinary skill in the art in view of the drawings and specification. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the embodiments of the present disclosure can be readily understood by considering the following detailed description in conjunction with the accompanying drawings.

DETAILED DESCRIPTION OF EMBODIMENTS

The Figures (FIG.) and the following description relate to preferred embodiments of the present disclosure by way of illustration only. It should be noted that from the following discussion, alternative embodiments of the structures and methods disclosed herein will be readily recognized as viable alternatives that may be employed without departing from the principles of the present disclosure.

Reference will now be made in detail to several embodiments of the present disclosure, examples of which are illustrated in the accompanying figures. It is noted that wherever practicable similar or like reference numbers may be used in the figures and may indicate similar or like functionality. The figures depict embodiments of the present disclosure for purposes of illustration only. One skilled in the art will readily recognize from the following description that alternative embodiments of the structures and methods illustrated herein may be employed without departing from the principles of the embodiments described herein.

Example Communication Device

Figure 1:
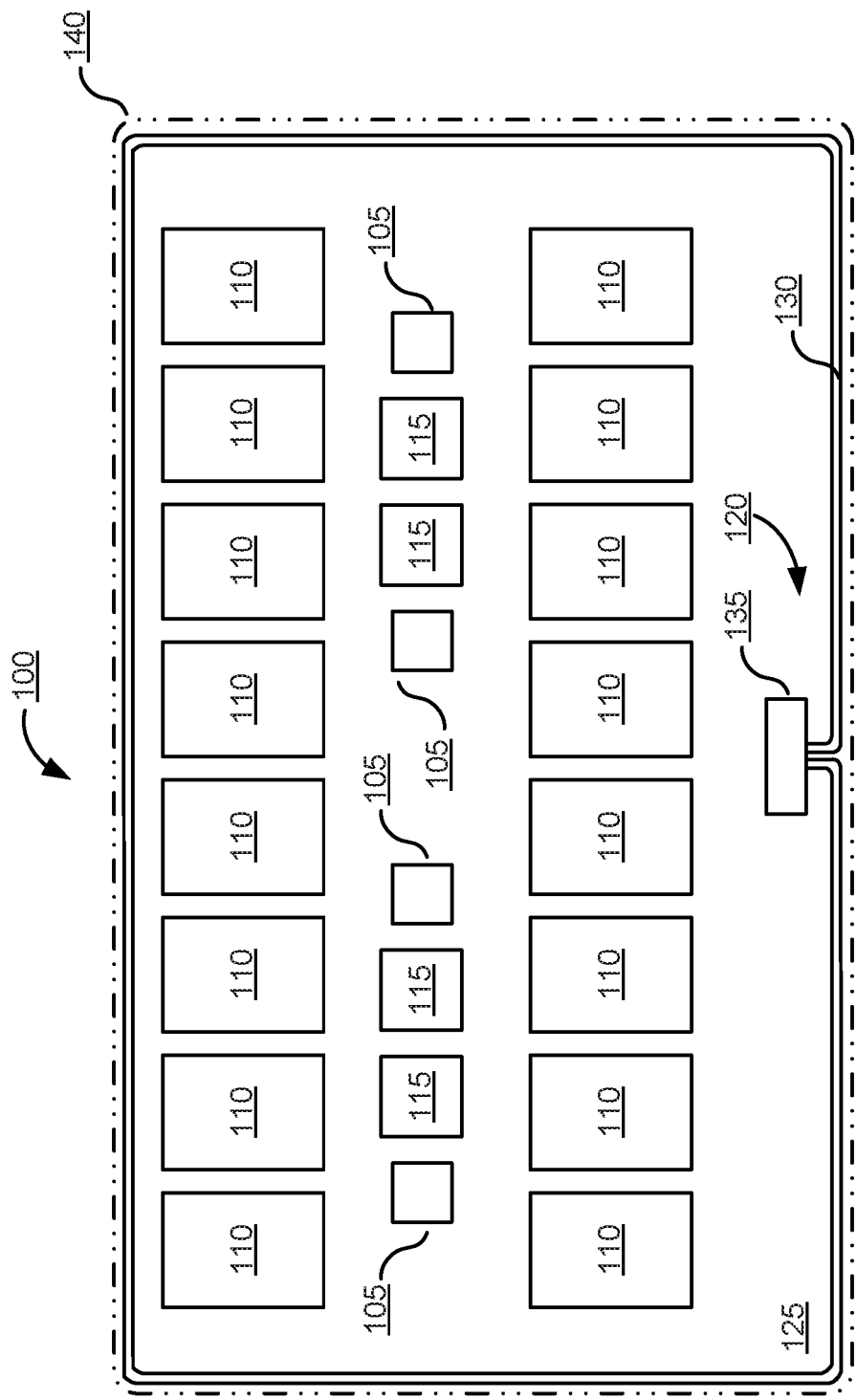
FIG. 1 illustrates a plan view of a communication device, according to one embodiment.

FIG. 1 is a plan view illustrating a communication device 100, according to one embodiment. As shown in FIG. 1, the communication device 100 is a portable device with a form factor similar to a credit card, security fob, smart card, or other portable storage device. The communication device 100 includes a data storage medium, which may include one or more memory devices 110, communication interface units 105, controllers 115, power management unit 120, an inductive coil 130, and a power interface circuit 135 all arranged and disposed on substrate 125 within the communication device. The memory device 110 may be volatile memory, such as random access memory (RAM), or non-volatile memory, such as flash memory, or another device that employs other suitable data storage technology, and data may be written to and read by the controller 115. The controller 115 manages the flow of data between a communication interface unit 105 and one or more memory devices 110. The controller 115 may be a separate integrated circuit, integrated into a memory device 110, or may be included in a processor (not shown) included in the communication device 100.

The communication interface unit 105 includes circuitry configured to transmit and receive close proximity extremely high frequency electromagnetic energy (i.e., transmissions) as further discussed with reference to FIG. 3. Examples of a communication interface unit 105 are described in U.S. patent application Ser. No. 13/471,052, which is incorporated by reference in its entirety. The power management unit 120 is a contactless power system, such as an inductive power system. For example, as shown in FIG. 1, the power management unit 120 includes an inductive coil 130 configured to receive electromagnetic energy and convert the received electromagnetic energy to electrical energy, and a power interface circuit 135 configured to distribute electrical power to the devices on the communication device 100. The power interface circuit 135 may also store part of the generated electrical energy in an energy storage unit, for example, a battery (not shown).

The substrate 125 may be a printed circuit board (PCB) or other dielectric material that includes an upper and a lower planar surface and multiple edges for a perimeter. In one example, one or more communication interface units 105 are positioned on the substrate 125 to provide communication between components coupled to the respective communication interface units 105 co-located on a planar surface of the substrate 125. In another example, one or more communication interface units 105 are placed on an upper and lower planar surface of the substrate to provide communication between components included on a substrate that includes corresponding communication interface units and arranged above or below the substrate 125, as further described with reference to FIG. 2. In a further example, one or more communication interface units 105 are arranged on the perimeter of the substrate 125 to provide communication between the communication device 100 and a computing device 300 that includes a corresponding communication interface unit, as further described with reference to FIG. 3.

As described herein, the communication device 100 may also be referred to as a client device, and in particular when the communication device 100 communicates with a host computing device. In some embodiments, a host and a client device are positioned at distance and alignment relative to each other sufficient to permit the corresponding communication interface units 105 on the client and host devices to exchange information.

The communication device 100 also includes a covering 140 or sealing layer disposed on the components arranged on the substrate, such that the covering 140 forms a hermetically sealed communication device 100. In one embodiment, the covering 140 is composed of a dielectric material or other non-electrically conductive material suitably transparent to electromagnetic energy in the EHF range (typically, 30-300 GHz). In another embodiment, the covering 140 is composed of a metallic or electrically conductive material suitable to direct, shield, or otherwise manipulate the propagation of EHF energy.

The communication device 100 may be backward compatible with SD, Multi Media Card (MMC), or other standards and include one or a combination of an EHF transmitter and EHF receiver. In one embodiment, the communication device 100 is water-proof and immune to electrostatic discharge (ESD) events. In one embodiment, the communication device is activated (i.e., switched into a power-on operation mode) responsive to receiving an EHF transmission or transferring information to another device. In one embodiment, the communication device 100 is self-powered. In another embodiment, the communication device 100 is powered through a wireless transmission means.

Figure 2:
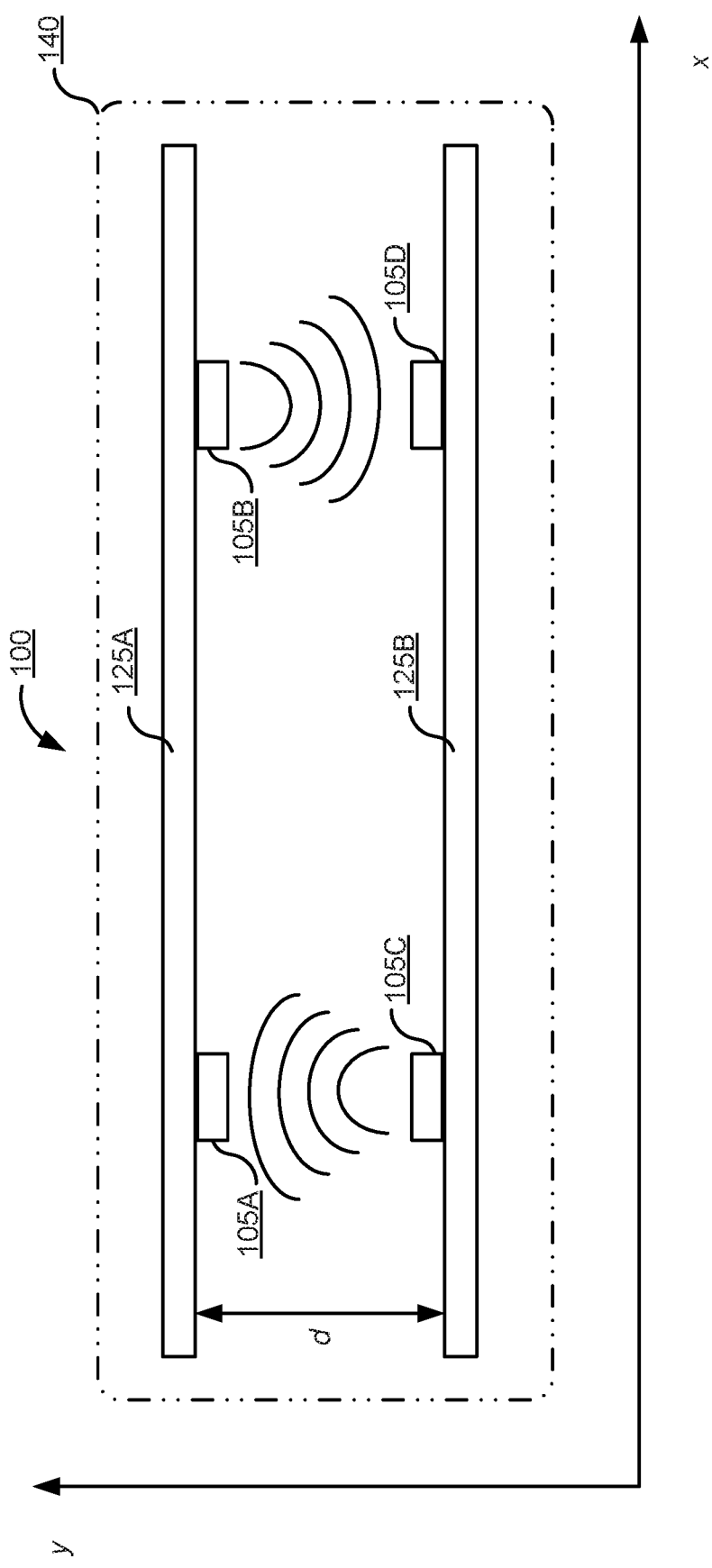
FIG. 2 illustrates an arrangement of a communication device, according to one embodiment.

FIG. 2 illustrates an arrangement of a communication device 100, according to one embodiment. The communication interface units 105 may be configured to transmit or receive an EHF transmission directionally or hemispherically. For example, the pair of communication interface units 105A and 105C is disposed facing each other on separate substrates within a communication device 100. As shown in FIG. 2, the pair of communication interface units 105A and 105C are is disposed and aligned on a lower surface of substrate 125A and on an upper surface of substrate 125B, respectively, and configured to transmit or receive EHF transmissions in a direction facing each other. The pair of communication interface units 105B and 105D is arranged and configured in a manner similar that described for the pair of communication interface units 105A and 105C to form a vertical contactless (i.e., non-physical connection between transmit and receive devices) communication path between communication interface units 105A and 105C. The configurable directionality of an EHF communication transmitted or received by a communication interface unit 105 enables inter-layer communication paths to be created to allow information to be exchanged between components disposed on substrate 125A and components disposed on substrate 125B. For portable communication devices, using a stacked-substrate configuration with communication interface units 105 creating contactless inter-layer communication paths allows storage capacity to scale while maintaining the footprint of the communication device.

In one embodiment, the spatial energy distribution of the EHF communication signal transmitted and received by a communication interface unit 105 may be relatively wide compared to the form factor of the communication interface unit 105. In turn, the substrates 125A and 125B may be substantially physically aligned in one axis with a physical separation in the other axis. For example, as shown in FIG. 2, the substrates 125A and 125B are aligned along the x-axis such that one or both of the communication interface unit pairs 105A and 105B and 105C and 105D can exchange information. Also, as shown in FIG. 2 the substrates 125A and 125B are separated by a distance d along the y-axis. In one implementation, the distance d is specified within a tolerance ranging from approximately 1 mm to approximately 5 cm without substantially affecting the communication channel between the communication interface unit pair 105A and 105C and the pair 105B and 105D. In other implementations, the substrates 125A and 125B are arranged in other alignments suitable to allow the communication interface unit pairs 105A and 105C and 105B and 105D to exchange information. Other alignment configurations employ one or a combination of discrete angles, waveguides, or other transmission medium to direct an EHF transmission along a specified path between paired communication units 105.

As shown in FIG. 2, the communication channel between paired communication interface units 105 is contactless. Intervening structures within the communication path between facing communication interface units 105 can be designed in order to not disrupt the exchange of information between the paired communication interface units 105. For example, in one embodiment, in a stacked configuration paired communication interface units 105 are disposed on nonadjacent layers and form a transmission path, such as a contactless conduction path, that traverses one or more intervening layers. In some cases, the intervening layers are composed of dielectric materials or other materials transparent to EHF emission. In one embodiment, regions of an intervening layer in the transmission path of paired communication interface units 105 are configured to be free from materials, such as metal components, that would impair communication between transmitting and receiving EHF devices across the transmission path. In one embodiment, regions of an intervening layer comprise electrically conductive materials configured to operate as an antenna (e.g., a slot antenna) to direct an EHF communication along a particular transmission path. In another embodiment, one or more intervening layers may include an opening or aperture on multiple intervening layers in the conduction path between paired communication interface units 105. The aperture is configured to have a size sufficient to pass an EHF transmission undisturbed such that communication between paired communication interface units 105 can be maintained. One or a combination of additional and alternative arrangements of substrates 125 and corresponding paired communication interface units 105 may be arranged as a communication device 100 assembly, as described in U.S. patent application Ser. No. 13/471,052, which is incorporated by reference in its entirety.

Figure 3A:
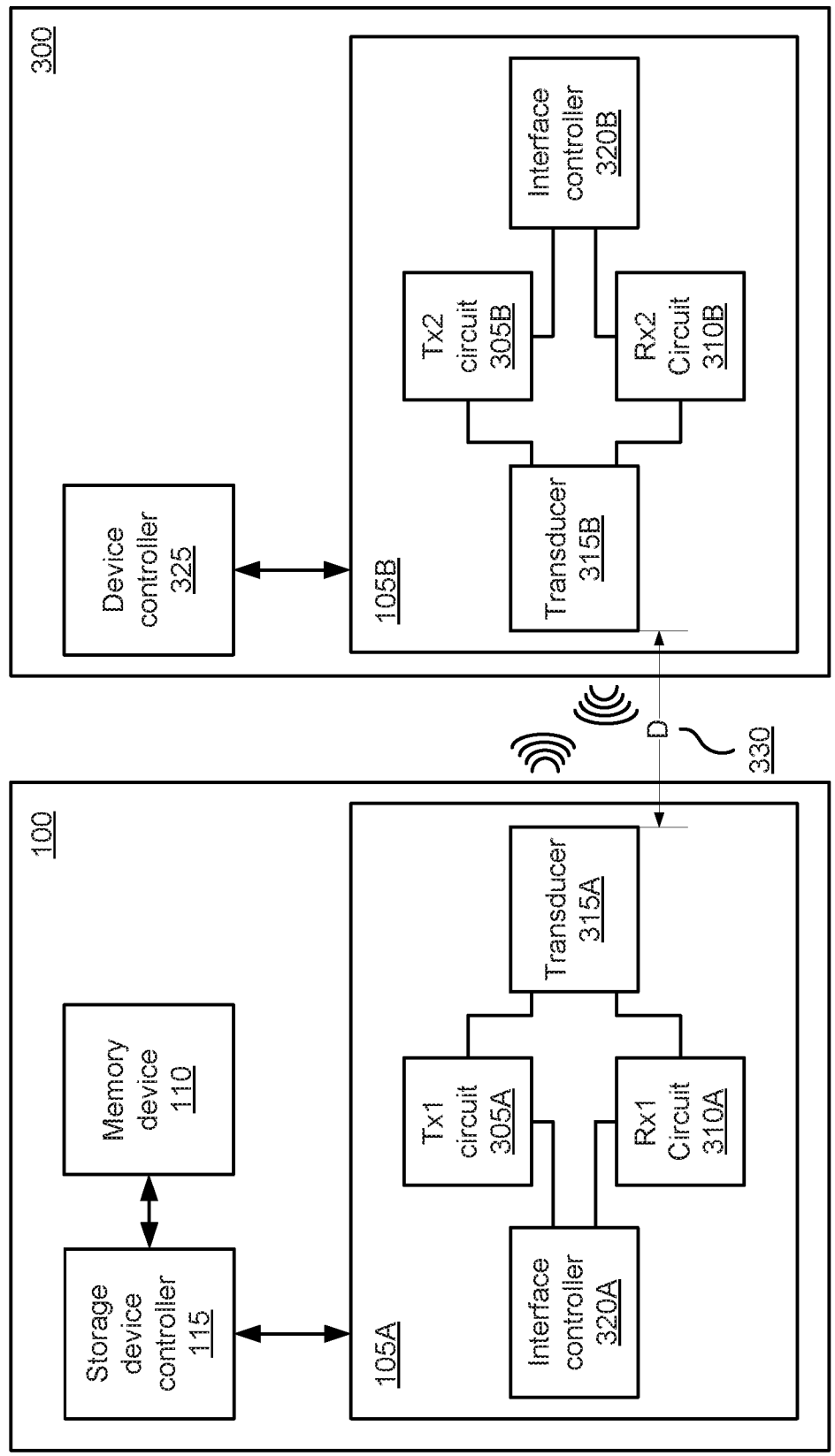
FIG. 3A illustrates a block diagram of a close proximity extremely high frequency (EHF) communication interface included in a communication device of FIG. 1 and a computing device, according to one embodiment.

FIG. 3A illustrates a block diagram of a portable information storage system using a close proximity extremely high frequency (EHF) communication interface included in a communication device 100 and a computing device 300, according to one embodiment. In one embodiment, the portable information storage system includes a communication device 100 and storage device reader 300. The communication device 100 may be any suitable storage system capable of reading and writing electronic information, as previously described in reference to FIG. 1. More generally, the communication device 100 may also be a component or storage subsystem that is integrated into another device or system having a form factor larger than a mobile computing device or a portable storage device. The computing device 300 includes any suitable device having information processing functionality and one or more interfaces configured to receive information electrically, optically, electromagnetically, or other transmission format suitable to communicate with the communication device 100. The communication device 100 includes one or more communication interface units 105 for exchanging information with another communication interface unit 105 over a transmission path. The communication interface unit 105 is configured to transmit and receive an EHF transmission to another communication interface unit 105 over a conduction path. In particular, the communication interface unit 105 uses EHF close proximity coupling to exchange information at high data rates (e.g., 8 Gb/s) over a conduction path link ranging from approximately 1 mm to approximately 5 cm using EHF frequencies (typically, 30-300 GHz). The conduction path may include air or a dielectric material suitable to transmit electromagnetic energy in the EHF frequency range.

In one embodiment, the communication interface unit 105 includes a transmitter circuit 305 and a receiver circuit 310 coupled to an interface controller 320. The communication interface unit 105 also includes a transducer 315 coupled to the output of the transmitter circuit 305 and the input of the receiver circuit 310. The transmitter circuit 305A is configured to receive electrical information, representing information stored on the memory device 110, via the interface controller 320A and send the received electrical information to the transducer 315A for conversion to an EHF signal for transmission. In one embodiment, the transmitter circuit 305 operates in conjunction with interface controller 320 and transducer 315 to convert electrical information into an EHF transmission and to transmit a modulated EHF transmission. The receiver circuit 310 is a circuit configured to receive the EHF transmission from a transmitter circuit 305 using transducer 315, convert the received EHF transmission to electrical information, and provide the converted electrical information to interface controller 320 for further processing. Further details of the description of the transmitter circuit 305 and receiver circuit 310 are described in U.S. patent application Ser. No. 13/760,089, which is incorporated by reference in its entirety.

In one embodiment the transducer 315 is a folded dipole or loop antenna and configured to operate at radio frequencies in the EHF spectrum. The dimensions of the transducer 315 are suitable for operation in the EHF band of the electromagnetic frequency spectrum. In one embodiment, the transmitter circuit 305 and the receiver circuit 310 are coupled to a single transducer 315. In other embodiments, the transmitter circuit 305 and the receiver circuit 310 are coupled to separate transducers 315.

Figure 3B:
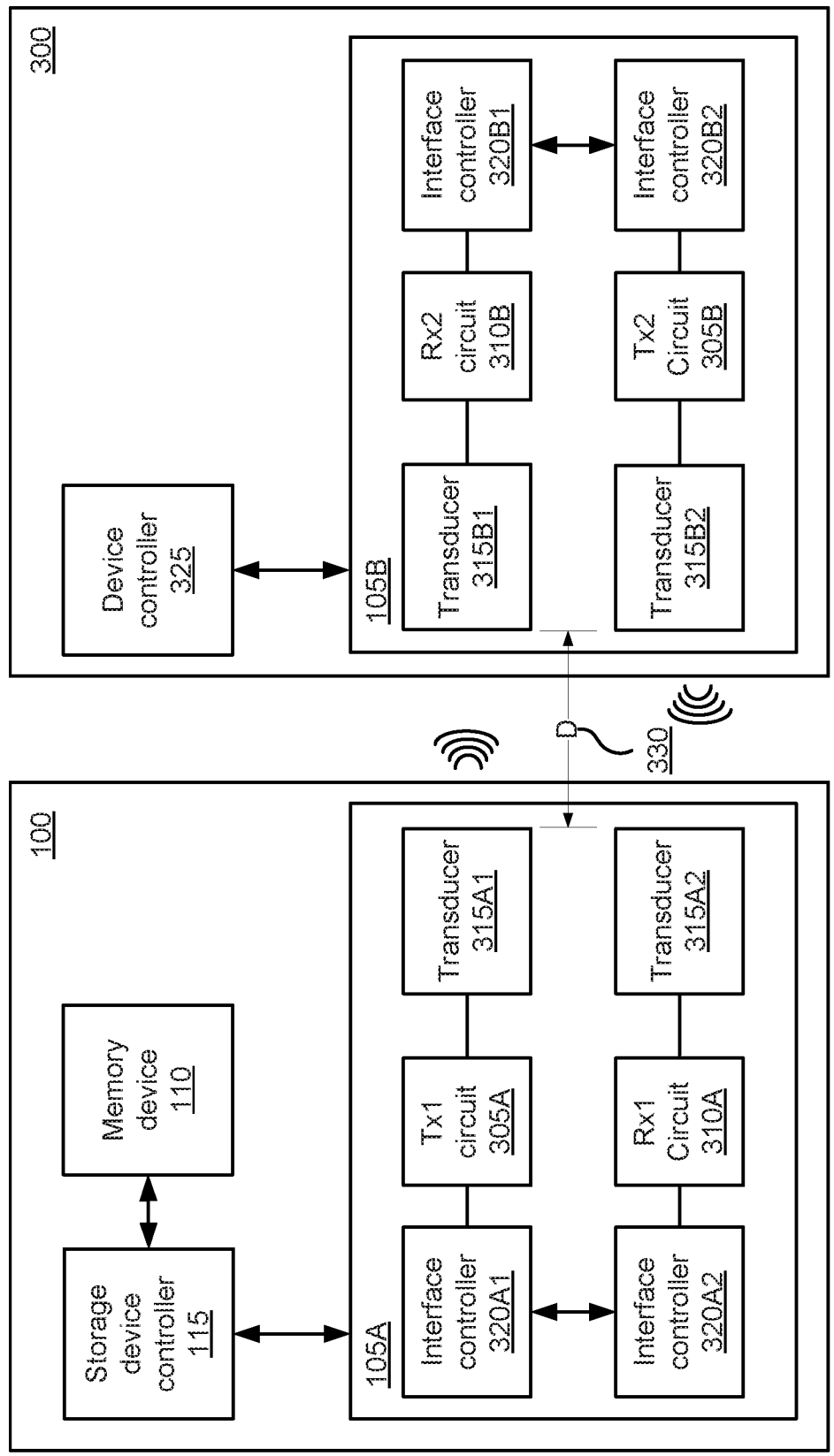
FIG. 3B illustrates a block diagram of another close proximity extremely high frequency (EHF) communication interface included in a communication device of FIG. 1 and a computing device, according to one embodiment.

For example, as shown in FIG. 3B, a communication interface unit 105 includes multiple transducers 315A1 and 315A2 and multiple interface controllers 320A1 and 320A2. As shown in FIG. 3B, in the transmitter path, interface controller 320A1 is coupled to the input of transmitter circuit 305A. The output of the transmitter 305A is coupled to the input of transducer 315A1. Similarly, in the receiver path of the communication interface unit 105, interface controller 320A2 is coupled to the output of the receiver 310A. The output of the transducer 315A2 is coupled to the input of the receiver circuit 310A. The interface controllers 320A1 and 320A1 are coupled together to exchange information, such as timer information as will be later described with respect to the link-training mode operation. The computing device 300 may be configured in a similar manner as described with respect to the storage device 100 in FIG. 3B.

Returning to FIG. 3A, the interface controller 320 conditions information accessible by the communication device 100 or the computing device 300 for transmission by the transmitter circuit 305 and reception by the receiver circuit 310. Information conditioning applied to the interface controller 320 includes modulating transmitted EHF information, encoding electrical information accessible by the communication device 100 or the computing device 300, and generating an identifying message (e.g., a beacon transmission) for exchanging identifying information about the respective devices between the devices. Modulation schemes applied by the interface controller 320, for example, include amplitude-shift keying modulation, or other suitable modulation technique capable of being demodulated by a receiver circuit 310 of a corresponding receiving device.

During discovery mode operation, the interface controller 320 generates identifying information from a sending device and detects identifying information from a receiving device over a transmission path. As previously described, during the discovery operation mode the communication device 100 and one or more computing devices 300 transition from a low power state to transmit or receive identifying information from another device to determine whether the other device is available to exchange information. The minimum latency from a low power or powered down state to a discovery operation mode is approximately 1 microsecond. In one example, during the discovery operation mode, the communication device 100 powers up periodically and monitors a receive channel for identifying information from an EHF transmission generated by a computing device 300 or another storage device. To manage power, the interface controller 320 maintains the communication device 100 in powered down state or low power state during a substantial portion of the discovery operation mode relative to the portion of the discovery operation mode when the communication device 100 is monitoring a receive channel. For example, the interface controller 320 may enable the receiver circuit 310 to monitor for received EHF transmissions for 100 ns and disable the receiver circuit 310 for 999,900 ns in a given cycle. In this example, the power draw of the communication device 100 is approximately 50 mA when the receiver circuit is enabled and 5 μA when the receiver is disabled. Generally the on/off ratios (i.e., the ratio of when the receiver circuit 310 is enabled compared to when the receiver circuit 310 is disabled during the discovery operation mode) is approximately 1000:1.

The transmitter circuit 305B in the computing device 300 powers up periodically to transmit identifying information, such as a beacon, in the form of an EHF transmission. To manage power, the interface controller 320B maintains the ON/OFF ratios (i.e., the ratio of when the transmitter circuit 305B is enabled compared to when the transmitter circuit 305B is disabled during the discovery operation mode) to be approximately 1:500 (e.g., 2 ms on, 998 ms off). The minimum latency from a low power or powered down state to a discovery operation mode is approximately 1,000 ms. In this example, the current draw of the computing device 300 is approximately 40 mA when the transmitter circuit 305B is enabled and approximately 80 μA when the transmitter circuit is disabled. In one example, to enhance data transmission security the communication device 100 is configured to not respond or otherwise acknowledge receipt of a beacon transmitted by the computing device 300.

During the discover mode operation, the interface controller 320 also regulates the turn-on time and ON-time duration of the transmitter circuit 305 and receiver circuit 310 to ensure synchronization between the beacon transmission and beacon detection operations. In one embodiment, interface controller 320 enables the receiver circuit 310 to monitor for received beacon for a duration sufficient to coincide or otherwise overlap with a portion of the period of the beacon transmission generated by a computing device 300. In one example, the ON/OFF ratio for the receiver circuit 310A and the transmitter circuit 305B are set by the respective interface controllers 320A and 320B to enable the beacon transmission generated by the computing device 300 to coincide with multiple monitoring periods (i.e., ON periods where the receiver circuit 310A is enabled). For example, the interface controller 320A causes the transmitter circuit 305A to turn ON periodically every 50 μs, and causes the receiver circuit 310A to turn ON periodically for an ON-time duration of 100 μs. This ensures overlap between transmit and receive circuits. The ON/OFF ratio of the transmit circuit may be 1:500, while the ON/OFF ratio of the receive circuit may be 1:1000. The limitations of the ON/OFF ratio of the transmit circuit are limited by the minimum beacon pulse and minimum receive circuit ON period. For example, if the minimum beacon pulse is 100 ns and the receive circuit ON period is 100 us, the ON/OFF ratio of the transmit circuit may be set to 1:500. This ensures that if a beacon is present, the receive circuit will be able to detect it under all circumstances. The limitations of the ON/OFF ratio of the transmit circuit are limited by the receive circuit ON period and required wake-up time. For example, if the receive circuit ON period is 100 us and the required wake-up time is 100 ms, the ON/OFF ration of the receive circuit may be set to 1:1000. In another example, controller 320 enables the receiver circuit 310 to monitor for received beacon with an ON/OFF sequence that occurs at a lower rate or frequency (e.g., one hundredth) than the ON/OFF sequence of the beacon transmitted by transmitted circuit 305. In this example, by having a much different rate of enabling the receiver circuit 310 versus the transmitter circuit 305, a sufficient duration (i.e. at least one pulse of the ON/OFF sequence) can be set to coincide between the beacon sent by the transmitter circuit 305 and detected by a receiver circuit 310. In another example, the interface controller 320B of the computing device 300 causes the transmitter circuit 305B to chop (i.e., periodically switch the beacon transmission ON and OFF during a beacon transmission period). In this example, the interface controller 320B maintains a beacon transmission with an ON/OFF ratio of 1:5 during a beacon transmission period, while maintaining an ON/OFF ratio of 1:100 when the transmitter circuit 305B is enabled to transmit a beacon. This gives an overall ON/OFF ratio of 1:500. In another example, the interface controller 320A of the communication device 100 maintains the monitoring period, while the interface controller 320B varies the beacon period. The variation may range from 10 nanoseconds to 1 second, or longer.

In another example, the respective interface controllers use one or more reference clocks to synchronize the beacon transmission period with the monitoring period. Using a reference clock in such a manner enables narrower beacon transmission periods and lower beacon rates, which in turn, reduce the overall power draw for both the communication device 100 and the computing device 300. In another example, the data sequence used during the beacon period and the monitoring (i.e., listening) period are encoded, such that the transmitter circuit 305 transmits a particular bit sequence during the beacon period and the receiver circuit 310 of the receiving device looks for the particular bit sequence in the beacon EHF transmission during monitoring mode. The discovery operation mode is complete when each interface monitoring unit 320 in at least a pair of communicating devices determines that transmitted and received bit sequences match during the respective monitoring and beaconing transmission periods.

In one embodiment, the interface controller 320 of a transmitting device includes proximity-sensing circuitry configured to detect signals from a corresponding receiving device and determine based at least in part on the detected signal whether the pair of devices are physically arranged relative to each other in a manner to exchange information reliably. The proximity sensing circuitry of the interface controller 320 includes circuitry to detect an EHF transmission received from the receiver circuit, analyze attributes of the detected transmission, and decode information included in the detected EHF transmission, as further described in U.S. patent application Ser. No. 13/524,963, which is incorporated by reference in its entirety. The detected EHF transmission may be generated by the computing device 300 attempting access to information stored on communication device 100 or the detected EHF transmission may be derived (e.g., a reflected signal) from an EHF transmission generated by a communication interface unit 105.

In one example, the interface controller 320A is configured to detect an EHF transmission received from computing device 300 and determine the relative or actual distance between a surface of the communication interface unit 105A to a surface of a nearby object by detecting a change in a transmission property (e.g., an attribute of the impedance, return loss, etc.) of the transmitter side of transducer 315A caused by the nearby object. In this sense, the nearby object may be considered a transducer field-modifying device. A change in a transmission property of the transmitter side of the transducer 315A produces a signal that when compared with a reference signal indicates whether a nearby object is within a threshold distance D 330 from the communication device 100, as further described in U.S. patent application Ser. No. 13/524,963, which is incorporated by reference in its entirety. The value of the threshold distance D 330 is stored in memory accessible by the interface controller 320 and is used by the interface controller 320 for further processing.

In another example, the interface controller 320A includes circuitry to calculate a delay in the propagation time of an EHF transmission between the communication interface unit 105A and the communication interface unit 105C. The signal propagation time represents a measure of the round-trip time or portion thereof (e.g., time of flight from the transmitter of a first device to a receiver of a second device and vice versa) that it takes for an EHF transmission generated by the communication device 100 and received by the computing device 300 to be returned to the communication device 100. The interface controller 320A includes circuitry to determine the propagation time between transmitter circuit 305A and the receiver circuit 310B; the receiver circuit 310B and the transmitter circuit 305B; and the transmitter circuit 305B and the receiver circuit 310A based on attributes of the detected EHF transmission, and generate an indication of proximity between the communication device 100 and the computing device 300 based on the indication.

Figure 4:
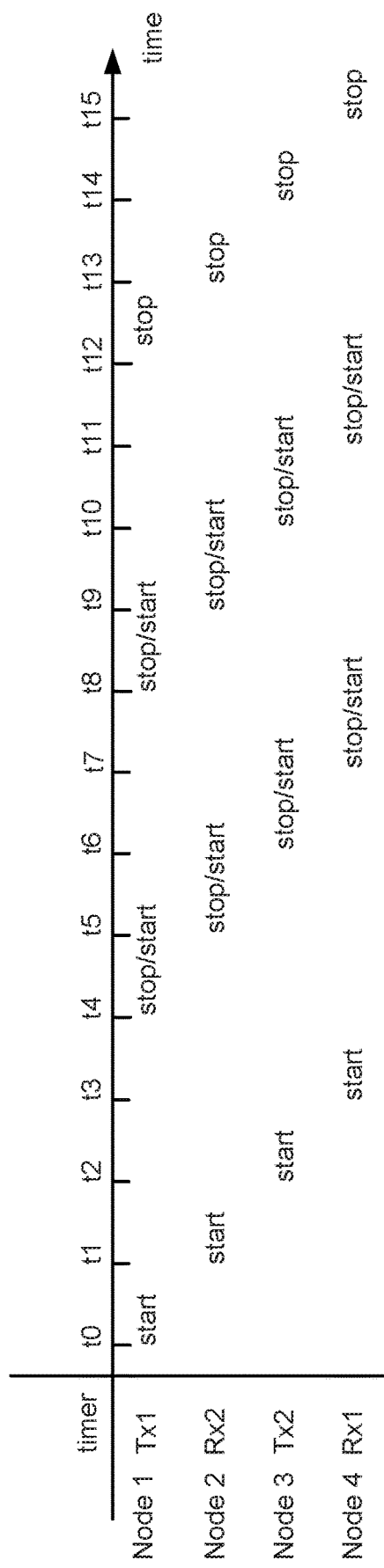
FIG. 4 illustrates a graph that shows the timing of multiple timer cycles for transmitter and receiver timers included in a pair of communication interface units of FIG. 3B, according to one embodiment.

For example, in the example shown in FIG. 3A, during the link-training mode, the interface controller 320A of communication device 100 initiates one or more timers that count the number of clock cycles beginning from when training information is transmitted by a transmitter or receiver and ending when the transmitted information is received by the same transmitter or receiver circuit as further described in conjunction with FIG. 4. In one implementation, the training information is represented as a sequence of specified bits generated by the interface controller 320A. In another implementation, the training information is provided to the interface controller 320A from the memory device 110 or a source external to the communication device 100.

The interface controllers 320 operate in conjunction with the transmitter and receiver circuits of the respective communication interface units 105 to start and stop multiple timers in a cyclic manner. In one embodiment, during each timer cycle, each transmitter circuit 305 and each receiver circuit 310, in each communication interface unit 105 start a timer when the training information is sent by the circuit, and stop the timer when the training information completes a round-trip path returning to the circuit from which the link-training information originated. In one example, the round-trip path from the transmitter circuit 305A begins at the transmitter circuit 305A, and includes the transducer 315A1, the transmission path between the communication interface units 105A/B, transducer 315B1, the receiver circuit 310B, the interface controllers 320 B1 and 320 B2, the transmitter circuit 305B, the transducer 315B2, the transducer 315A2, the receiver circuit 310A, and the interface controllers 320A1 and 320A2.

In operation, the interface controller 320A starts a transmitter timer when the link-training information is transmitted by the transmitter circuit 305A and stops the timer when the link-training information transmitted by the transmitter circuit 305A is received by the transmitter circuit 305A or interface controller 320A1 from the receiver 310A via the interface controller 320A (or 320A1). This process is continued by the interface controller 320B (or 320B2), which starts a receiver timer when the link-training information from the transmitter circuit 305A is sent from the receiver circuit 310B to the transmitter circuit 305B via the interface controller 320B (or 320B2), and stops the receiver timer when the link-training information transmitted by the receiver circuit 310B is received by the receiver circuit 310B from communication interface unit 105A. The interface controllers 320B (or 320B1) also starts a transmitter timer when the link information from the receiver circuit 310 is transmitted by the transmitter circuit 305B and ending when the link-training information transmitted by the transmitter circuit 305B is received by the transmitter circuit 305B from the receiver 310B. To complete one iteration of the round-trip propagation calculation, the interface controller 320A (or 320A2) starts a receiver timer when the link-training information from the communication interface unit 105B is received by the receiver circuit 310A, and stops the receiver timer when the link-training information transmitted by the receiver circuit 310A is received by the receiver circuit 310A from communication interface unit 105B.

The communication interface unit 105 sends the link-training information at a specified time period or interval, including during periods when other information or data is not being exchanged between the communication interface units 105A and 105B. The communication interface unit 105 uses one or more techniques to exchange link-training information, including using a subcarrier, or using a coding scheme to send the link-training information along with other information. For example, a novel 8B/10B coding scheme may be used to exchange information between communication interface units 105A and 105B, where two bits are used to carry link-training information.

FIG. 4 illustrates a graph that shows the timing of multiple timer cycles for the transmitter and receiver timers included in the pair of communication interface units 105A and 105B of FIG. 3B. As shown in FIG. 4, the transmitter circuit 305A starts a transmitter timer at time t0, followed by the receiver circuit 310B, which starts a receiver timer at time t1 when the receiver circuit 310B receives the training information from the transmitter circuit 310A. In turn, the transmitter circuit 305B starts another transmitter timer at time t2 when it transmits the training information received by the receiver circuit 310B. At time t3, the receiver circuit 310A starts another receiver timer when it receives the training information from the transmitter circuit 305B. To complete the first timer cycle, the respective timers stop counting in the same order that the timers started their respective timers. For example, at time t4, the transmitter circuit 305A stops the transmitter timer, followed by the receiver circuit 310B stopping a receiver timer at time t5, the transmitter circuit 305B stopping a transmitter timer at time t6, and the receiver circuit 310A stopping a receiver timer at time t7 to complete the first cycle. In another implementation, at times t4-t11, a time stamp of the timer value of the respective timers is recorded while the timers continue running. In a further implementation, at times t4-t11, the respective timers stop and are restarted when the node sends the link training information to the next node in the communication path.

As previously described, in some implementations, the interface communication units 105A/B employ multiple timer cycles. The timers could count continuously throughout the multiple cycles or could be reset at each cycle. For example, as shown in FIG. 4, a second timer cycle begins at time t8 and ends at time t15. The transmitter and receiver timer information calculated by the interface controllers 320A and 320B is used by the interface controllers 320A and 320B to calculate a round-trip propagation time (i.e., time of flight) for the propagation of the training information between each device.

Figure 5:
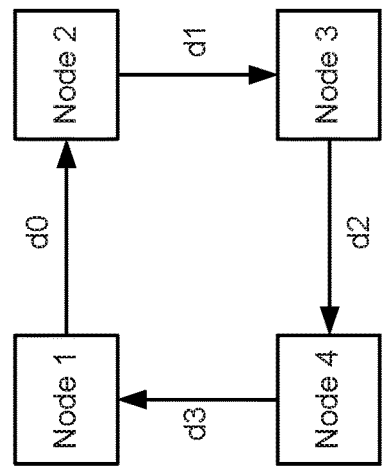
FIG. 5 shows a block diagram illustrating a time of flight calculation of information exchanged between communication interface units of FIG. 3B, according to one embodiment.

FIG. 5 shows a block diagram illustrating a time of flight calculation of information exchanged between communication interface units 105. Each of the nodes 1-4 represent one or a combination of components included in a communication interface unit 105. In one example, a node includes the interface controller 320, the transmitter circuit 305 or the receiver circuit 310, and the transducer 315. In other examples, a node includes alternative or additional components. As shown in FIG. 5, the calculated time of flight of a round-trip path from any of nodes 1-4 is equivalent, and equal to the sum of the propagation times d0-d4 between each node. In one embodiment, the propagation time between some nodes is specified or known because a pair of nodes is located on the same communication interface unit 105. In one example, a first pair of nodes includes node 1 and node 4 and a second pair of nodes includes node 2 and node 3. In this example, the first pair of nodes represents the transmitter circuit 305A and the receiver circuit 310A, and the second pair of nodes represents the receiver circuit 310B and the transmitter circuit 305B. The propagation time between nodes included in the first pair of nodes or the second pair of nodes may be programmed or otherwise stored in a memory accessible by the respective communication interface unit 105. Alternatively, other parameters, such as the distance between nodes included in the first or second pair of nodes or other parameters from which the propagation time may be inferred or calculated, may be stored in a memory accessible by the respective communication interface unit 105.

In one implementation, the time of flight calculation is performed multiple times and the results are averaged to determine an average time of flight, which may be used as a seed for encrypting information exchanged between the communication device 100 and the computing device 300. In one implementation, the time of flight calculation is performed at a specified time or interval time, such as during power-up of the communication device 100 or the computing device 300, when data is not being transmitted (e.g., during an idle period) between the communication device 100 and the computing device 300, or at a specified interval in accordance with the system requirements. The interface controller 320A/B then stores the value of the calculated time of flight in memory accessible by the respective devices for further processing. In another embodiment, the interface controllers 320A/B calculate the time of flight between each device during transport mode in a manner similar to that as described during link-training mode.

By employing multiple timer cycles, the interface communication units 105 can more accurately calculate the round-trip propagation time of information exchanged between the communication interface units 105A/B. Accordingly, the calculated time of flight of the training information may be used as a seed to generate an encryption key as further described in conjunction with FIG. 6.

Returning to FIG. 3B, in one embodiment, the interface controller 320A includes circuitry to detect the frequency of an EHF transmission signal received during link-training mode or transport mode and uses the measurement of the detected frequency to generate an indication of proximity of the communication interface unit 105A to a nearby object. The presence of a nearby object, e.g., the computing device 300, sufficiently close to the transducer 315A causes the frequency of the detected signal to vary based on the presence and proximity of the nearby object, as further described in U.S. patent application Ser. No. 13/524,963, which is incorporated by reference in its entirety. The interface controller 320 is further configured to use other attributes (e.g., measure of transmission strength or calibration information specifying receiver threshold energy) of the detected EHF transmission to determine the distance between corresponding communication interface units. In another embodiment, the communication device 100 and/or the computing device 300 identification information is exchanged between the two devices.

Figure 6:
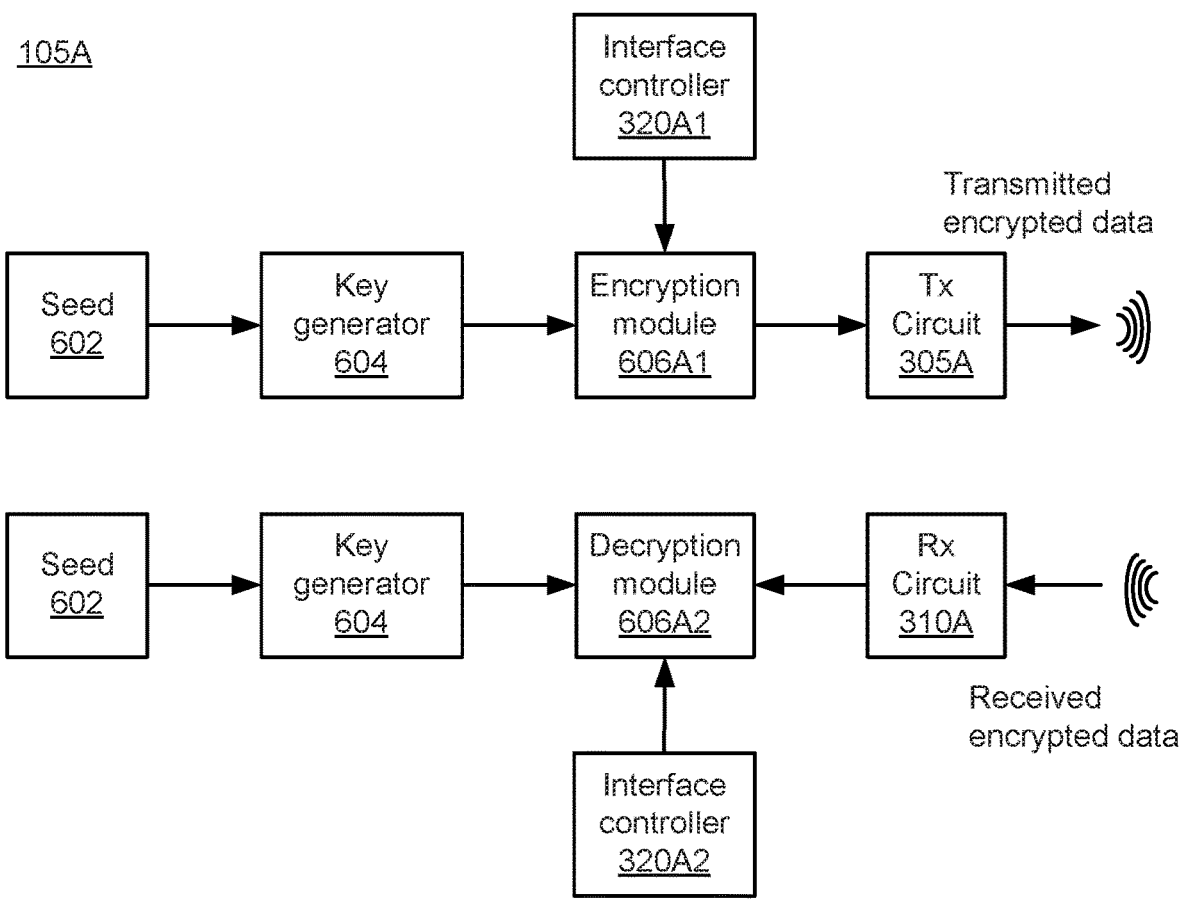
FIG. 6 illustrates a block diagram of a communication interface unit that includes an encryption module, according to one embodiment.

In one embodiment, during the transport mode the interface controller 320 is configured to establish an authentication protocol by which the communication device 100 can regulate access by other devices to a portion of information stored on memory device 110 as further described in conjunction with FIG. 6. In one embodiment, the interface controller 320A uses attributes of the detected authentication EHF transmission received during the link-training mode to encrypt the information transmitted by the transmitter circuit 305A to the computing device 300 during transport mode to permit access to information stored on the communication device 100 by authorized devices. For example, the interface controller 320A uses the calculated propagation time or time of flight between devices as a basis or seed to encrypt data transmitted by the transmitter circuit 305A. The propagation time or time of flight between the communication device 100 and the computing device 300 is calculated by the interface controller 320B included in the computing device 300 during link-training mode in a manner similar to that described for the communication device 100. In turn, the computing device 300 uses the propagation time or time of flight calculated by the computing device 300 to decrypt the encrypted information received from the communication device 100 and to encrypt information transmitted to the communication device 100 by the computing device 300 during transport mode. In another embodiment, the interface controller 320A uses attributes (e.g. transmission property of the transmitter side of the transducer 320A) of the EHF transmission, received during the transport mode as a seed to encrypt the information transmitted by the transmitter circuit 305A to the computing device 300 during transport mode. Similarly, the interface controller 320B uses attributes of the detected authentication EHF transmission received during the transport mode to encrypt the information transmitted by the transmitter circuit 305B to the communication device 100 during transport mode. Alternatively, one or a combination of time of flight measurements, transmission property parameters, detected frequency of an EHF transmission, or any parameter derived or calculated therefrom, may be used as a seed to encrypt information exchanged between with communication device 100 and the computing device 100.

In another embodiment, the interface controller 320 uses an authentication code to verify that another device is permitted to exchange information with the communication device 100. An authentication code is a device identifier (e.g., multi-bit code) that operates as a device key. The authentication code (e.g., cryptographic algorithm(s)) may be stored in a memory location accessible by the communication device 100, encoded by the interface controller 320A, and transmitted by transmitter circuit 305A to the computing device 300. Alternatively, the authentication code may be stored in the transmitter circuit 305A/B, the receiver circuit 310A/B, or the interface controller 320A/B. The interface controller 320B includes circuitry to decode the EHF transmission received from the transmitter circuit 305A, recover the authentication code, and compare the recovered authentication code with a copy of an authentication code stored on the computing device 300 to determine if the codes match, indicating an authorized device. In one embodiment, the communication device 100 employs key exchange, High-bandwidth Digital Content Protection (HDCP), public key encryption, or other known encryption techniques to protect information exchanged between the communication device 100 and the computing device 300. In one embodiment, one or more of device key information, authentication code, and other security-related information is stored in a read-only part of the communication device 100 (e.g., a protected region of the memory device 100 or within an integrated circuit that embodies the communication interface unit 105A.

FIG. 6 illustrates a block diagram of a communication interface unit that includes an encryption module. As shown in FIG. 6, the communication interface unit 105A transmits encrypted information using a seed 602 to generate an encryption key for encrypting the transmitted information. In one embodiment, the seed 602 includes one or a combination of the calculated round-trip propagation time, calculated transmission property of the transmitter side of a transducer, and the detected frequency of an EHF transmission that serves as an input to a key generator 604. In one implementation, the key generator 604 is implemented in hardware, such as using a linear feedback shift register (LFSR). In another implementation, the key generator 604 is implemented in software, or implemented using a combination of hardware and software. The key generator 604 supplies the generated encryption key to an encryption module 606A1 and a decryption module 606A2.

In the transmitter path of the communication interface unit 105A, the encryption module 606A1 uses the encryption key as a basis to encode (encrypt) information received from the interface controller 320A1 in accordance with an encryption scheme or protocol. The encryption module 606A1 may employ one or more encryption algorithms, or a combination of hardware and software to encode information using the generated key. The encrypted information output by the encryption module 606A1 is received by the transmitter circuit 305A for transmission to the communication interface unit 105B.

The receiver path of the communication interface unit 105A operates in a manner similar to the transmitter path. In the receiver path of the communication interface unit 105A, the decryption module 606A2 uses the encryption key as a basis to decode (decrypt) information received from encrypted information received by the receiver circuit 310A in accordance with a decryption scheme or protocol. The decryption module 606A2 employs one or more decryption algorithms, or a combination of hardware and software to decode information using the key generated by the key generator 604A. The decrypted information output by the decryption module 606A2 is received by the interface controller 320A2 for further processing. Accordingly, during the transport mode the interface controllers 320 are configured to establish an authentication protocol by which the communication device 100 can regulate access by other devices to a portion of information stored on memory device 110.

Returning to FIG. 3B, although the components of the communication device 100 are depicted as separate components, one or more components of the communication device 100 may be combined or otherwise integrated into a single component. In one example, the communication interface unit 105A is integrated with the storage device controller 115. In another example, the communication interface unit 105 is integrated with memory device 110.

In one embodiment, the computing device 300 is a storage device reader configured to access data stored on memory device 110 of the communication device 100. The computing device 300 includes a device controller 325 that operates as a processor or controller to manage the operations of the computing device 300. In another embodiment, the computing device 300 is a storage device with functionality similar to the communication device 100. In one example, the computing device 300 is an unencapsulated storage subsystem that may be stacked vertically or otherwise arranged to communicate with communication device 100. In another example, the computing device 300 is an encapsulated storage device, such as the communication device 100.

In one embodiment, the functionality of the communication device 100 varies based on the computing device 300 in communication with the communication device 100. For example, the communication device 100 is configured to manage access to data stored on the communication device 100 based on computing device 300 in communication with the communication device 100. Data, such as movies, may be accessed from the storage device when the communication device 100 or the surface of an object coupled to communicate with the communication device 100 comes in contact (i.e., contactless communication) with a particular computing device 300. By operating in such a manner, the pair of devices operate in conjunction to authenticate access to data stored on the communication device 100 based on a particular device pairing. In another embodiment, functionality of communication device 100 varies based on the device type of the communication device 100 (e.g., mobile phone, imaging device, tablet computing device, etc.) and the computing device 300 in communication with the communication device 100. For example, when operating in communication with a computing device 300, a communication device 100 included in a mobile phone operates as a local storage device. In another example, when operating in communication with a computing device 300, a communication device 100 included in an imaging device (e.g., a digital camera) operates as storage for an operating system. In one embodiment, the communication device 100 allows access to only certain portions of the memory device 110 based on one or more attributes of the computing device 300. For example, based on the authentication attributes of the computing device 300, a portion of the memory device 110 is made accessible to the computing device 300.

In one embodiment, the communication device 100 controls the operation of the computing device 300. Alternatively, the computing device 300 controls the operation of communication device 100. That is, the communication device 100 operates as a data sink or a data source depending on the pairing of the communication device 100 and the computing device. In another embodiment, multiple communication devices 100 operate in a master/follower mode. In master/follower mode, information stored on a follower device is accessible responsive to a master device being read by a computing device 300 and sending an indication to the follower device that the master device has been read by the computing device 300. In the master/follower mode, the master communication device 100 is operative to provide access to a master key to authenticate access to the follower communication device 100. The master and follower devices authenticate each other by employing authentication techniques as previously described with reference to the interface controllers 320 of FIG. 3A/B, or any similar technique.

In one embodiment, the computing device 300 performs a secure data trim of data stored on communication device 100. For example, the computing device 300 compares data stored on communication device 100 at a first time with data stored on the storage device at a later time to determine if the stored data has been removed or deleted, and to perform a secure trim into the storage location where the data has been removed or deleted. In another embodiment, the computing device 300 periodically logs data or a record of the data transferred between the communication device 100 and the computing device 300. The computing device 300 is further configured to identify unauthorized data (i.e., copyrighted data or content determined as being unauthorized based on data access permissions determined based at least in part on the particular pairing of the communication device 100 with the computing device 300) during a logging operation. Upon a determination of existence of unauthorized data, the computing device 300 disables access to the unauthorized data.

In one embodiment, the particular pairing of a communication device 100 with a computing device 300 alters the user profile of software executing on a device associated with the communication device 100. For example, a device, such as a tablet computing device or a mobile phone has a personal user profile stored on a communication device 100 included in the tablet or mobile phone. When the device establishes communication with a computing device 300, the computing device 300 removes the personal profile stored on the communication device 100, and replaces the personal profile with a secured profile (e.g., work profile) suitable to use in a secure location.

Access Control

For example, such functionality may be employed in an access control system for managing access to a secure location, such as private building or office, government facility, or other location that may provide access to sensitive information. In this scenario, to gain access (e.g., check-in) to a secure location, a person places the communication device 100 in physical proximity to an access control reader that incorporates the computing device 300. In one example, devices are in physical proximity when the distance between the device is less than or equal to a threshold distance sufficient for the communication device 100 and the computing device 300 to establish a communication channel and exchange information, as described with reference to FIG. 3. When the devices are in physical proximity, the computing device 300 initiates a check-in process. During the check-in process the computing device 300 performs action to record time, location, and a device state of the communication device 100 used by a user to provide access to the secure location. For example, during the check-in process, the computing device 300 stores a time stamp representing when the communication device 100 paired with the computing device 300 of the access control reader. The computing device 300 sends the time stamp information to communication device 100 or computing system for the secure location, which in turn, stores one or a combination of time stamps, corresponding user identification information, and location information in an access log. In another example, the computing device 300 also determines whether there is personal data stored on the communication device 100, copies any discovered stored personal data to a secure location, and removes the personal data from the communication device 100. In one example, the computing device 300 identifies personal data based on file attributes, including file extension, file name, and associated application software. Other common known techniques may be employed by the computing device 300 to identify personal data stored on the communication device 100.

In one embodiment, during the check-in process the computing device 300 also limits one more capabilities of the communication device 100. For example, during the check-in process the computing device 300 disables image capture, audio capture, and communication functionality of the communication device 100. In another example, the computing device 300 also disables one or more capabilities of the communication device 100 based on location of the communication device 100, where the location of the communication device 100 is determined based on global positioning information (GPS), Wi-Fi positioning information, or other location information provided by the communication device 100.

In one embodiment, during the check-in process, the computing device 300 loads a secure profile on the communication device 100 that provides secure communication access within the secure location without disclosing passwords, network information, or other sensitive data to the user. In another embodiment, the computing device 300 logs data stored on the communication device 100 at the time of check-in. In one example, the computing device 300 scans the logged data for viruses or unauthorized data, and removes or quarantines such data in a secure location for further processing. In another example, during a check-out process the computing device 300 compares the logged data to a record of the data transferred to or stored on the communication device 100 after the check-in process. If the comparison indicates that the communication device 100 accessed unauthorized information, the computing device 300 will remove the corresponding files during the check-out process.

When exiting the secure location, the user causes the communication device 100 to initiate the check-out process, where the user repeats the process of placing the communication device 100 in physical proximity with the access control device equipped with a computing device 300. The access control device, in turn, restores the communication device 100 to a pre-check-in state. For example, during the check-out process the access control device performs one or more of the following actions: removes the secure profile from the communication device 100, restores the user's personal data, and restores the communication device's 100 capabilities to the state prior to entering the secure location.

In another embodiment, a communication device 100 operates as a key to a home. In one example, an access point (e.g., door, garage door, etc.) of a home includes one or more access control regions that include a computing device 300. Like in the check-in/check-out example previously described, a person places the communication device 100 in physical proximity to an access control panel that incorporates the computing device 300. The computing device 300, in turn, authenticates the user based on information located on the computing device 300 and the communication device 100. In one example, the computing authenticates the user in accordance with an authentication protocol as previously described with reference to the interface controllers 320 included in the respective pair of devices. In another example, the computing device 300 operates in conjunction with the communication device 100 to perform a multi-factor authentication. In one scenario, the communication device 100 and the computing device 300 perform a two-factor authentication, where the communication device 100, along with one of a personal identification number (PIN), a user's biometric information (e.g., retina scan, thumb print, voice signature, etc.) maintained on the computing device 300 or communication device 100 is used to authenticate the user's identity.

Once authenticated, the computing device 300 registers the authenticated user's status to indicate the user is currently in the home, and accesses the authenticated user's profile to execute access control settings associated with the authenticated user. Access control settings specify, for example, lighting, environmental, audio/visual, security, communication systems, or other home system controls. The access control settings may be stored in one or a combination of the communication device 100 or the computing device 300 incorporated in the access control panel. In operation, the computing device 300 incorporated in the access control panel communicates with other systems in the home to execute the access control settings in accordance with the access control settings of a particular authenticated user. In some cases, the access control settings for a particular user specify variations based on time of day, or based on whether other authenticated users are registered as being home. Using the communication device 100, a user registered as being at home may view the home access history. The home access history specifies any users presently at home and information about when those users arrived home and any other detectable activity of the other users since they arrived home. The access history also specifies when a user leaves the home, because a registered user is deregistered by the computing device 300 when the user leaves. In one example, the computing device 300 and the communication device 100 operate in a process similar to the previously described check-out process when a user leaves the home. For example, to lock the door when exiting the home, the user places the communication device 100 in physical proximity with an access control panel that incorporates the computing device 300. The computing device 300 re-authenticates the user, executes any user access control settings (e.g., turn off lights, set timers, enable security system, etc.), and locks the door.

In another access control application, a check-in/check-out process, similar to that previously described may be used regulate access between countries at a border crossing location or when passing through customs at a transit station. In this application, a user wishing to enter another country or region checks-in devices equipped with a user-accessible electronic storage medium at an access control system. During check-in, a communication device 100 is scanned for harmful information, such as viruses, by a computing device 300 included in an access control system. In another example, during check-in, the computing device 300 accesses location information, network connectivity information, or other information that may indicate activity of the user associated with the device, which may be potentially harmful to a country or region regulating access. When exiting a region or a country, the computing device 300 performs a check-out process and scans the communication device 100 for unauthorized information (e.g., confidential government information). If detected, such unauthorized information is removed from the communication device 100 by the computing device 300 prior to completion of the check-out process.

In a further access control application, the pairing of a communication device 100 with a computing system 300 included in an access control system is used to regulate access to a venue requiring a ticket for entry. In one embodiment, a user receives a ticket for entry into a particular event, such as a concert, sporting event, movie, or other performance. The received ticket is stored on the communication device 100 in an electronic format capable of being read by the computing device 300 included in the access control system. For example, the ticket may be stored as an image file format that includes a ticket identifier, such as an optical machine readable representation of data (e.g., bar code, Quick Response (QR) code, etc.) identifying the ticket. When entering the venue or event location, the user initiates a check-in process by placing the communication device 100 that stores an electronic representation of the ticket near an access control system interface that includes a computing device 300.

During the check-in process, the computing device 300 scans the communication device 100 and detects the ticket identifier or other attribute of the ticket. The computing device 300 operates or alone or in conjunction with other computing systems at the event to authenticate the detected ticket. Once authenticated, user associated with the communication device 100 is allowed entry into the event. In one embodiment, responsive to the ticket being authenticated, the computing device 300 sends a notification to the communication device 100 indicating that the ticket has been authenticated. In addition to the notification, the computing device 300 may also send event information (e.g., event maps, application software, advertisements, offers for sale, coupons, seating charts, etc.) to the communication device 100 for display to the user.

In another venue access control application, the pairing of a communication device 100 with a computing system 300 included in an access control system is used to regulate the capturing of images of objects on display at the venue using the communication device 100. In venues, such as a museum, taking pictures of exhibits or art work may be prohibited. In such a situation, images of museum objects may be sent to a communication device 100 by placing the communication device 100 in physical proximity to an information transfer interface that includes a computing device 300. In one embodiment, the computing device 300 sends for display on the communication device 100 one or more selections of previously captured images to the communication device 100, or sends the option to capture an image from an image capture device located in the museum. In another embodiment, the computing device 300 sends one or more selections to transfer information about the museum, museum exhibit, or other related information (e.g., advertisements, offers for sale, coupons, etc.) to the communication device 100 when the user places the communication device 100 in physical proximity to the information transfer interface. Additionally, an information transfer interface may be used in a similar manner for other applications or at other venues or locations, including amusement parks, cruise ships, raceways, weddings, photo booth kiosks, to send images or information to a communication device 100.

In a further access control application, a check-in/check-out process, similar to that previously described may be used to regulate access to operation of a vehicle. In this application, during a check-in process a user places the communication device 100 in physical proximity to an access control panel on the vehicle that incorporates the computing device 300. The computing device 300, in turn, authenticates the user based on information located on the computing device 300 and the communication device 100 used by the user to gain access to the vehicle. In one example, the computing device 300 authenticates the user in accordance with an authentication protocol as previously described with reference to the interface controllers 320 included in the respective pair of devices. In another example, the computing device 300 operates in conjunction with the communication device 100 to perform a multi-factor authentication, such as that described with reference to the home access control.

Once authenticated, the computing device 300 registers the authenticated user's status to indicate the user is currently in the vehicle, and accesses the authenticated user's profile to execute vehicle control settings associated with the authenticated user. Vehicle control settings specify, for example, time, place, and maximum operating speed for operating the vehicle. These settings may be programmed by a user, such as the vehicle's owner, rental car company, car dealer, or other person or entity charged with control of the vehicle. The settings are communicated by the computing device 300 to the vehicle's drive control systems to execute the vehicle control settings. In some cases, the access control settings specify variations based on time of day, or whether another user of a threshold age can be authenticated as being in the vehicle at same time as the requesting user. For example, to comply with government regulations, a driver holding a limited use license or driving permit, may be permitted to drive under only with another person above a particular age. In this example, the requesting driver and the accompanying drive would check-in to the vehicle access control system using separate communication devices 100 associated with the respective user. When the access control system of the vehicle authenticates the identity of both users, the requesting user would be allowed to operate the vehicle in accordance with the vehicle access settings associated with requesting user.

In another example of vehicle access control, a communication device 100 associated with a user and an access control system that includes a computing device 300 is used to detect a potentially impaired driver. Like the previous vehicle access control, the driver initiates a check-in process by placing the communication device 100 in physical proximity to an access control panel on the vehicle that incorporates the computing device 300. The computing device 300, in turn, authenticates the user and initiates a driver assessment process.

In one embodiment, the driver assessment process includes determining current driving conditions and presenting for display on the communication device 100 a series of prompts to determine whether a requesting driver's ability to operate the vehicle might be impaired based on the determined driving conditions and the current physical state of the requesting driver. In one example, the computing device 300 interacts with one or a combination of the communication device 100 and the vehicle's infotainment system to determine the time of day, whether conditions, traffic conditions, and vehicle location. The vehicle location may be represented as, for example, geographic coordinates, a street address, or proximity to one or more merchant locations that offer goods or services capable of impairing a person's ability to safely operate a vehicle.

During the driver assessment process, the computing device 300 presents one or more prompts to the user and receives one or more responses to the prompts. The prompts are formatted as one or a combination of text, audio, symbols, images, or other visual or audio representation perceivable by a user using the communication device 100. For example, the prompt may be presented for display on the communication device 100 as a game to test the driver's dexterity, response time, vision, or other cognitive ability that could impact one's ability to safely operate a vehicle. In one example, the prompt requests that the user enter a response by interacting with a display of the communication device 100, speaking, or providing biometric information (eye tracking information or voice information for speech recognition) to the communication device 100.

The communication device 100 sends the received prompt responses to the computing device 300 for evaluation. The computing device 300 uses one or more stored factors to score a response. Factors include, for example, the substance of the response, the response time, or training information (voice signature or eye tracking rate). The aggregate score of each factor is compared to a competency threshold based on driving conditions. For example, in cases where the current driving conditions detected by the computing device 300 indicate a present time of 2:30 am, raining, and the car is located near a bar, the competency threshold is higher than if the detected current driving conditions indicate a present time of 10:00 am, sunny, and the car is located near a park. In cases where the aggregate score meets or exceeds competency threshold, the computing device 300 allows the requesting driver to operate the vehicle. Otherwise, the computing device 300 may disable or limit operation of the vehicle, cause the communication device 100 to display information for alternative modes of transportation, or send a notification to a designated entity or person that the requesting driver needs assistance.

Figure 7:
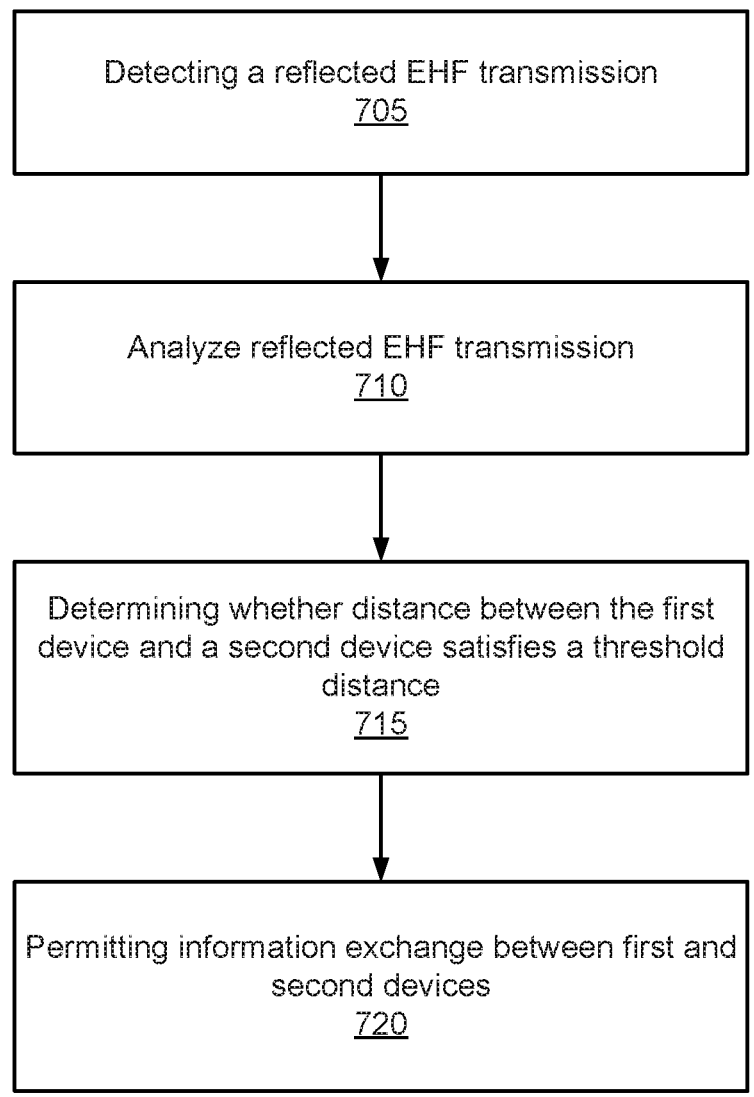
FIG. 7 illustrates a flowchart of a method for controlling access to a communication device, according to one embodiment.

FIG. 7 illustrates a flowchart of a method for controlling access to a communication device, according to one embodiment. To improve security when communicating between the communication device 100 and the computing device 300, the interface controller 320 also manages the exchange of data between communication interface units 105 of corresponding devices by verifying that communication interface unit 105B of the computing device 300 is within a predetermined range and is part of a device identified as being authorized to communicate with the communication device 100 before or during a communication attempt. The communication device 100 detects 705 a reflected EHF transmission from a reflective surface associated with a computing device, communication device, or other device that includes a communication interface unit capable of communicating with the corresponding communication interface unit included in the communication device 100. The communication device 100 analyzes 710 the reflected EHF transmission to detect characteristics of the reflected EHF transmission that may be used as an indicator of proximity of the communication device 100 to another device in close proximity (1 mm-5 cm) to the communication device 100. In analyzing the reflected EHF transmission, the communication device 100 employs known electromagnetic signal analysis techniques to EHF transmissions, including time domain, frequency domain, impedance measurements techniques.

Using the analysis results, the communication device 100 determines 715 whether distance between a first device and second device satisfies a threshold distance sufficient to exchange EHF transmissions between a first and second communication interface units included in the respective devices. In one embodiment, an indication of the actual or relative proximity between devices is determined based on a detected change in the transmission property of the transmitter side of a transducer included in the first device caused by the reflection of an EHF transmission off of a surface of the second device. In one embodiment, an indication of proximity between the first device and second device is determined based on a calculation of the propagation time of an EHF signal transmitted by the first device, received by the second device, and transmitted back to the first device. Using the calculated propagation time, the proximity between the first device and the second device may be determined. In another embodiment, an indication of proximity between the first device and second device is determined based on a calculation of the frequency of a reflected EHF signal transmitted and received by the first device after reflection by a surface of the second device. The frequency of the received reflected EHF transmission is proportional to the propagation delay of the EHF communication signal as previously described. Because the signal propagation time through a distance D 330, as shown in FIG. 3, increases as the distance D 330 increases, the frequency and propagation delay are related to the distance D 330. And thus the distance may be calculated based on a measure of the frequency of the reflected EHF transmission received by the first device (e.g., the communication device 100). In further embodiments, one or a combination of the signal strength or other attributes of a reflected EHF transmission detected by the first device may be used to determine the proximity between the first device and the second device. Upon a determination that the calculated proximity between a first and second device is not within a threshold distance, the communication device 100 prohibits information to be exchanged between the communication device 100 and another device attempting communication with the communication device 100 and returns to step 715.

Upon a determination that the calculated proximity between a first and second device is within a threshold distance, the communication device 100 permits 720 information to be exchanged between the communication device 100 and another device attempting communication with the communication device 100. In permitting information to be exchanged between the two devices (e.g., the communication device 100 and the computing device 300) the interface controller 320A operates in conjunction with the transmitter circuit 305A to modulate the transmission of information stored on memory device to the computing device 300 as previously described with respect to FIGS. 3A and 3B. In one embodiment, the interface controller 320 encodes information transmitted by transmitter circuit 305 by employing one or more encryption schemes. In one example, the interface controller 320 encodes information transmitted by the transmitter circuit 305 based on the calculated measure of the time of flight of and EHF transmission from the transmitter of a first device to a receiver of a second device and vice versa. The calculated time of flight is known by both devices, and thus may be used as an encryption key. And because the time of flight between devices changes in a random manner, the time of flight operates as a random encryption key generator that is used by the interface controller 320 to provide a high measure of data transmission security between the two devices. The interface controller 320 may execute one or more known encryption algorithms using the time of flight as an encryption key to encode and decode information exchanged between the communication device 100 and computing device 300.

In one embodiment, upon a determination that the calculated proximity between a first and a second device is within a threshold distance, the interface controller 320A employs an authentication protocol to determine whether a device attempting to communicate with the communication device 100 is an authorized device. For example, the communication device 100 may use an authentication code to verify that another device is permitted to exchange information with the communication device 100. To determine whether a device is an authorized device, the communication device 100 receives information including an authentication code from a requesting device. In one embodiment, the authentication code is received responsive to a query (e.g., a beacon signal) from the communication device 100. In other embodiments, the authentication code is sent by the computing device 300 independent of receiving a request or query from the communication device 100. The communication device 100 recovers the authentication code, compares the recovered authentication code with an authentication code stored on the communication device 100 to determine if the codes match. The computing device 300 performs the same operation as the communication device 100 to compare an authentication code received from the communication device 100 with an authentication code stored on the computing device. If the codes match on both devices, the communication device 100 operates as described in step 720. Otherwise, the communication device 100 prohibits information from being exchanged between the two devices, and returns to one of steps 705, 710, or 715.

Upon reading this disclosure, those of skill in the art will appreciate still additional alternative designs for a portable communication device that includes a contactless secure communication interface. For example, although the interface controller 320A authenticates another device as being authorized to access data stored on the communication device 100 based on one or more attributes of EHF transmissions from the computing device 300, the same principles of this disclosure are also applicable to alternative designs based on other types of signals transmitted or received by the communication device 100. Thus, while particular embodiments and applications of the specification have been illustrated and described, it is to be understood that the disclosure is not limited to the precise construction and components disclosed herein and that various modifications, changes and variations which will be apparent to those skilled in the art may be made in the arrangement, operation and details of the method and apparatus of the present disclosure disclosed herein without departing from the spirit and scope of the present disclosure.

What is claimed is:

1. A method comprising, by a first communication device:
    exchanging first information via wireless communication with a second communication device;
    calculating a round-trip propagation time of the first information traveling to and from the second communication device, wherein the calculated round-trip propagation time is an average of multiple calculations of round-trip propagation time of the first information traveling to and from the second communication device;
    generating an encryption key based at least in part on the calculated round-trip propagation time; and
    exchanging second information via wireless communication with the second communication device, the exchanging includes at least one of:
        encrypting, using the encryption key, the second information sent to the second communication device, and
        decrypting, using the encryption key, the second information received from the second communication device.

2. The method of claim 1, wherein the first information is unencrypted.

3. The method of claim 1, further comprising, by the first communication device, generating an indication of proximity of the second communication device based at least in part on the calculated round-trip propagation time.

4. The method of claim 1, wherein exchanging the first information via wireless communication with the second communication device includes exchanging the first information via an extremely high frequency (EHF) signal.

5. The method of claim 1, wherein the exchanging includes encrypting, using the encryption key, the second information sent to the second communication device.

6. The method of claim 1, wherein the exchanging includes decrypting, using the encryption key, the second information received from the second communication device.

7. An apparatus comprising:
    a first device configured to:
        exchange first information via wireless communication with a second device;
        calculate a round-trip propagation time of the first information traveling to and from the second device, wherein the calculated round-trip propagation time is an average of multiple calculations of round-trip propagation time of the first information traveling to and from the second communication device;
        generate an encryption key based at least in part on the calculated round-trip propagation time; and
        exchange second information via wireless communication with the second device, the exchange including at least one of:
            encrypting, using the encryption key, the second information sent to the second device, and
            decrypting, using the encryption key, the second information received from the second device.

8. The apparatus of claim 7, wherein the first information is unencrypted.

9. The apparatus of claim 7, wherein the first device is further configured to generate an indication of proximity of the second device relative to the first device based at least in part on the calculated round-trip propagation time.

10. The apparatus of claim 7, wherein the first device configured to exchange the first information via wireless communication with the second device includes exchanging the first information via the wireless signals are an extremely high frequency (EHF) signal.

11. The apparatus of claim 7, wherein the exchange includes encrypting, using the encryption key, the second information sent to the second device.

12. The apparatus of claim 7, wherein the exchange includes decrypting, using the encryption key, the second information received from the second device.

13. A method comprising, by a first communication device:
    exchanging first information with a second communication device;
    calculating a round-trip propagation time of the first information traveling to and from the second communication device, wherein the calculated round-trip propagation time is an average of multiple calculations of round-trip propagation time of the first information traveling to and from the second communication device;

generating an encryption key based at least in part on the calculated round-trip propagation time; and exchanging second information with the second communication device, the exchanging includes at least one of:
- encrypting, using the encryption key, the second information sent to the second communication device, and
- decrypting, using the encryption key, the second information received from the second communication device.

14. The method of claim 13, wherein the first information is unencrypted.

15. The method of claim 13, further comprising, by the first communication device, generating an indication of proximity of the second communication device based at least in part on the calculated round-trip propagation time.

16. The method of claim 13, wherein the first information is exchanged using an extremely high frequency (EHF) signal.

17. The method of claim 13, wherein the exchanging includes encrypting, using the encryption key, the second information sent to the second communication device.

18. The method of claim 13, wherein the exchanging includes decrypting, using the encryption key, the second information received from the second communication device.

* * * * *